(12) United States Patent
Nakamura et al.

(10) Patent No.: US 7,547,429 B2
(45) Date of Patent: Jun. 16, 2009

(54) FULLERENE DERIVATIVES AND PROCESSES FOR PRODUCING THE SAME

(75) Inventors: Eiichi Nakamura, 5-3-3-1001, Honkomagome, Bunkyo-ku, Tokyo (JP); Yutaka Matsuo, Tokyo (JP)

(73) Assignees: Eiichi Nakamura, Tokyo (JP); Mitsubishi Chemical Corporation, Tokyo (JP)

( * ) Notice: Subject to any disclaimer, the term of this patent is extended or adjusted under 35 U.S.C. 154(b) by 577 days.

(21) Appl. No.: 10/854,296

(22) Filed: May 27, 2004

(65) Prior Publication Data
US 2005/0008558 A1   Jan. 13, 2005

(30) Foreign Application Priority Data
May 30, 2003   (JP) ............................ 2003-154418

(51) Int. Cl.
*C01B 31/02* (2006.01)
*B01J 19/08* (2006.01)

(52) U.S. Cl. .................. 423/445 B; 977/734; 977/735; 977/737

(58) Field of Classification Search ............. 423/445 R, 423/445 B; 977/734, 735, 736, 737, 738, 977/739, 740
See application file for complete search history.

(56) References Cited

U.S. PATENT DOCUMENTS

| 5,372,798 | A  | * | 12/1994 | McConnachie et al. | . 423/445 B |
| 6,765,098 | B1 | * | 7/2004  | Nakamura et al.    | ....... 548/338.1 |
| 6,969,772 | B2 | * | 11/2005 | Nakamura et al.    | ............. 556/9 |
| 7,018,599 | B2 | * | 3/2006  | Nakamura et al.    | .......... 423/414 |
| 7,202,374 | B2 | * | 4/2007  | Nakamura et al.    | ............. 556/9 |

FOREIGN PATENT DOCUMENTS

| JP | 10-167994   | 6/1998 |
| JP | 11-255508   | 9/1999 |
| JP | 11-255509   | 9/1999 |
| JP | 2002-241323 | 8/2002 |
| JP | 2002-241389 | 8/2002 |
| JP | 2003-146915 | 5/2003 |
| JP | 2003-212881 | 7/2003 |

OTHER PUBLICATIONS

Baggot, Perfect Symmetry The Accidental Discovery of Buckminsterfullerene, p. 200 "Illustration" (Oxford University Press 1994).*

Hamasaki, et al., Synthesis of Functionalized Fullerene by Mono-alkylation of Fullerene Cyclopentadienide, Chem. Lett. vol. 33, No. 3, pp. 329-329 (2004).*

(Continued)

*Primary Examiner*—Stuart L. Hendrickson
*Assistant Examiner*—Daniel C. McCracken
(74) *Attorney, Agent, or Firm*—Oblon, Spivak, McClelland, Maier & Neustadt, P.C.

(57) ABSTRACT

The present invention relates to a fullerene derivative having a partial structure represented by the general formula (I):

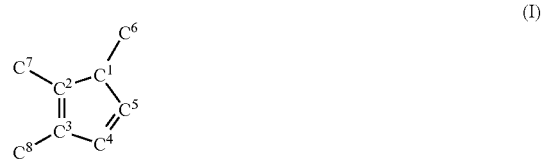

wherein $C^1$ to $C^8$ are carbon atoms constituting a fullerene skeleton in which $C^6$ to $C^8$ are independently bonded to an organic group having 1 to 50 carbon atoms, and $C^1$ is bonded to a substituted or unsubstituted alkyl group having 1 to 20 carbon atoms.

15 Claims, 6 Drawing Sheets

OTHER PUBLICATIONS

Sawamura, et al., Regioselective penta-addition of 1-alkenyl copper reagent to [60]fullerene. Synthesis of penta-alkenyl FCp ligand, J. Organometallic Chemistry 652 (2002) 31-35.*

Sawamura, et al., Cu(l)-mediated regioselective tri-addition of Grignard reagent to [70]fullerene. Synthesis of indenyl-type metal ligand embedded into graphitic structure., J. Mater. Chem., 2002, 12, 2109-2115.*

Yoichiro Kuninobu, "Synthesis of metallocene-type chemically-modified fullerene metal complexes", Department of Chemistry, The University of Tokyo, Presentation of master's thesis of 2000, presentation No. 11, Feb. 19, 2000, 5 cover pages, pp. 21 and 22 (with English translation).*

Motoki Toganoh, "Regioselective synthesis of hydrogenated fullerenes having a cyclopentadiene structure in a skeleton thereof and their application to transition metal complexes", Intermediate Report Presentation of study in Doctor Course, Lecture Room of Department of Chemistry, Faculty of Science, Nov. 14 and 15, 2002, 3 cover pages and pages.*

Toganoh, et al., Regioselective synthesis of [60]fullerene η5-indenide R3C60- and -cyclopentadienide R5C60- bearing different R groups, Org. Biomol. Chem., 2003, 1, 2604-2611.*

Matsuo, Stacking of Molecules Possessing a Fullerene Apex and a Cup-Shaped Cavity Connected by a Silicon Connection, J. Am. Chem. Soc. 2004, 126, 432-433.*

Robert T. Morrison and Robert N. Boyd, Organic Chemistry, pp. 172-177 (6th ed., Prentice-Hall 1992).*

Al-Matar, et al., Isolation and characterization of symmetrical C60Me5O3H, C60Me5OOH, C60Me4PhO2OH, and C60Me12; fragmentation of methylfullerenols, J. Chem. Soc., Perkin Trans. 2002; 2: 53-58.*

Kadish, et al., Electrosynthesis and Structural Characterization of Two (C6H5CH2)4C60 Isomers, J. Am. Chem Soc., 2002; 122: 563-570.*

M. Sawamura, et al., J. Am. Chem. Soc., vol. 118, No. 50, pp. 12850-12851, "The First Pentahaptofullerene Metal Complexes", 1996.

M. Sawamura, et al., Organic Letters, vol. 2, No. 13, pp. 1919-1921, "Stepwise Synthesis of Fullerene Cyclopentadienide $R_5C_{60}^-$ and Indenide $R_3C_{60}^-$. An Approach to Fully Unsymmetrically Substituted Derivatives", 2000.

M. Sawamura, et al., Chemistry Letters, pp. 1098-1099, "Pentaorgano[60]Fullerene $R_5C_{60}^-$. A Water Soluble Hydrocarbon Anion", 2000.

E. Nakamura, et al., Pure Appl. Chem., vol. 73, No. 2, pp. 355-359, "Chemistry of $\eta^5$-Fullerene Metal Complexes", 2001.

M. Sawamura, et al., Journal of Organometallic Chemistry, vol. 652, pp. 31-35, "Regioselective Penta-Addition of 1-Alkenyl Copper Reagent to [60]Fullerene. Synthesis of Penta-Alkenyl FCp Ligand", 2002.

M. Sawamura, et al., Journal of Materials Chemistry, vol. 12, pp. 2109-2115, "Cu(l)-Mediated Regioselective Tri-Addition of Grignard Reagent to [70]Fullerene. Synthesis of Indenyl-Type Metal Ligand Embedded Into Graphitic Structure", 2002.

H. Isobe, et al., Organic Letters, vol. 5, No. 23, pp. 4461-4463, "Synthesis of Fullerene Glycoconjugates Through Sulfide Connection in Aqueous Media", 2003.

Y. Matsuo, et al., J. Am. Chem. Soc., vol. 126, No. 2, pp. 432-433, "Stacking of Molecules Possessing a Fullerene Apex and a Cup-Shaped Cavity Connected by a Silicon Connection", 2004.

R. Hamasaki, et al., Chemistry Letters, vol. 33, No. 3, pp. 328-329, "Synthesis of Functionalized Fullerene by Mono-Alkylation of Fullerene Cyclopentadienide", 2004.

A. G. Avent, et al., Chem. Commun., pp. 1579-1580, "Spontaneous Oxidation of $C_{60}Ph5X$ (X=H,CI) to a Benzo[b]Furanyl[60]Fullerene", 1997.

R. S. Ruoff, et al., J. Phys. Chem., vol. 97, No. 13, pp. 3379-3383, "Solubility of $C_{60}$ in a Variety of Solvents", 1993.

M. Toganoh, University of Tokyo, partial English translation of doctoral thesis of Dr. Motoki Toganoh, pp. 76-79, and copy of a letter of presentation of the doctoral thesis of Dr. Motoki Toganoh (Japanese version), Jun. 2, 2003.

Yoichiro Kuninobu, "Synthesis of metallocene-type chemically-modified fullerene metal complexes", Department of Chemistry, The University of Tokyo, Presentation of master's thesis of 2000, presentation No. 11, Feb. 19, 2000, 5 cover pages, pp. 21 and 22 (with English translation).

Motoki Toganoh, "Regioselective synthesis of hydrogenated fullerenes having a cyclopentadiene structure in a skeleton thereof and their application to transition metal complexes", Intermediate Report Presentation of study in Doctor Course, Lecture Room of Department of Chemistry, Faculty of Science, Nov. 14 and 15, 2002, 3 cover pages and pp. 16-21 (with English translation).

Chemistry Letters 2000, pp. 1098-1099, Masaya Sawamura, et al., Pentaorgano[60]fullerene $R_5$ $C_{60}^-$. Soluble Hydrocarbon Anion.

Science, vol. 291, pp. 1944-1947, Shuiqin Zhou, et al., *Spherical Bilayer Vesicles of Fullerene-Based Surfactants in Water: A Laser Light Scattering Study*.

Gendai Kagaku, Apr. 1992, pp. 12-19, Marco A. Ciufolini, *Organic Chemistry of Buckminster Fullerene and Homologues thereof*, with English translation.

Gendai Kagaku, Jun. 2000, pp. 46-53, Jouchi Komatsu and Yasujiro Murata, *Attraction of soccer ball molecule $C_{60}$*, with English language translation.

Hamad Al-Matar, et al., Isolation and characterisation of symmetrical $C_{60}Me_5O_3H, C_{60}Me_5OOH, C_{60}Me_4PhO_2OH$, and $C_{60}Me_{12}$; fragmentation of methylfullerenois to $C_{58}$, J. Chem. Soc., Perkin Trans. 2, 2002, pp. 53-58.

Karl M. Kadish, et al., Electrosynthesis and Structural Characterization of Two $(C_6H_5CH_2)_4C_{60}$ Isomer, J. Am. Chem Soc., 2002, 122, pp. 563-570.

* cited by examiner

LC-2010 Detector
(290nm)

| RETENTION TIME | AREA | AREA RATIO (%) | HEIGHT | HEIGHT RATIO (%) |
|---|---|---|---|---|
| 0.898 | 368 | 0.01 | 38 | 0.02 |
| 2.010 | 1553 | 0.05 | 165 | 0.08 |
| 2.303 | 87464 | 2.67 | 4718 | 2.20 |
| 2.920 | 363 | 0.01 | 35 | 0.02 |
| 3.133 | 161 | 0.00 | 29 | 0.01 |
| 3.948 | 29574 | 0.90 | 1421 | 0.66 |
| 4.359 | 1887 | 0.06 | 137 | 0.06 |
| 4.751 | 3946 | 0.12 | 304 | 0.14 |
| 5.158 | 3251 | 0.10 | 277 | 0.13 |
| 5.492 | 5711 | 0.17 | 348 | 0.16 |
| 6.068 | 3138456 | 95.86 | 207258 | 96.47 |
| 8.660 | 345 | 0.01 | 30 | 0.01 |
| 10.604 | 477 | 0.01 | 37 | 0.02 |
| 11.050 | 602 | 0.02 | 48 | 0.02 |
| Total | 3274160 | 100.00 | 214845 | 100.00 |

LC-2010 Detector (290nm)

| RETENTION TIME | AREA | AREA RATIO (%) | HEIGHT | HEIGHT RATIO (%) |
|---|---|---|---|---|
| 1.017 | 335 | 0.01 | 20 | 0.01 |
| 1.276 | 572 | 0.02 | 39 | 0.02 |
| 2.017 | 79 | 0.00 | 12 | 0.01 |
| 2.304 | 81332 | 2.85 | 4205 | 1.99 |
| 2.967 | 69 | 0.00 | 10 | 0.00 |
| 3.289 | 335 | 0.01 | 35 | 0.02 |
| 3.545 | 630 | 0.02 | 56 | 0.03 |
| 4.136 | 3555 | 0.12 | 186 | 0.09 |
| 4.920 | 20677 | 0.72 | 1216 | 0.58 |
| 5.742 | 2738555 | 96.02 | 204835 | 97.15 |
| 7.568 | 4376 | 0.15 | 119 | 0.06 |
| 9.680 | 823 | 0.03 | 69 | 0.03 |
| 12.457 | 803 | 0.03 | 53 | 0.03 |
| Total | 2852141 | 100.00 | 210852 | 100.00 |

LC-2010 Detector
(290nm)

| RETENTION TIME | AREA | AREA RATIO (%) | HEIGHT | HEIGHT RATIO (%) |
|---|---|---|---|---|
| 1.176 | 906 | 0.02 | 54 | 0.01 |
| 2.295 | 46522 | 0.84 | 2434 | 0.65 |
| 3.275 | 10699 | 0.19 | 367 | 0.10 |
| 3.552 | 5993 | 0.11 | 345 | 0.09 |
| 4.141 | 12994 | 0.23 | 383 | 0.10 |
| 4.904 | 55770 | 1.01 | 2385 | 0.64 |
| 5.715 | 5395713 | 97.45 | 367334 | 98.31 |
| 7.466 | 6203 | 0.11 | 177 | 0.05 |
| 9.802 | 583 | 0.01 | 39 | 0.01 |
| 10.253 | 191 | 0.00 | 22 | 0.01 |
| 11.754 | 653 | 0.01 | 36 | 0.01 |
| 13.374 | 408 | 0.01 | 31 | 0.01 |
| 14.004 | 266 | 0.00 | 30 | 0.01 |
| Total | 5536902 | 100.00 | 373638 | 100.00 |

FULLERENE DERIVATIVES AND PROCESSES FOR PRODUCING THE SAME

FIELD OF THE INVENTION

The present invention relates to novel fullerene derivatives and processes for producing the same, and more particularly to fullerene derivatives having a specific partial structure on a fullerene skeleton thereof, and processes for producing these fullerene derivatives.

BACKGROUND OF THE INVENTION

Since the method for mass production of fullerene $C_{60}$ has been established in 1990, intensive studies on fullerene have been continuously performed. As a result, a large number of fullerene derivatives have been synthesized, and various functions and properties thereof have been discovered. In consequence, various uses and applications of the fullerene derivatives have been developed (refer to "Gendai Kagaku", April, 1992, p. 12, "Gendai Kagaku", June, 2000, p. 46, and "Chemical Reviews", 98, p. 2527 (1998)).

The present inventors have already synthesized and reported various penta-addition fullerene derivatives (Japanese Patent Application Laid-open (KOKAI) Nos. 10-167994, 11-255509 and 2002-241323, "J. Am. Chem. Soc.", 118, p. 12850 (1996), "Org, Lett.", 2, p. 1919 (2000), and "Chem. Lett.", p. 1098 (2000)). These fullerene derivatives of $C_{60}$ skeleton have a π-electron conjugated structure of a 50 electron system, and are different in steric configuration and electronic properties from $C_{60}$ itself having a π-electron conjugated structure of a 60 electron system. Therefore, it has been expected that the above penta-addition fullerene derivatives provide new electronic conductive materials, semiconductors and bioactive substances, etc.

In addition, there are known deca-addition fullerene derivatives that are larger in number of addition of organic groups than that of the penta-addition fullerene derivatives (refer to Japanese Patent Application Laid-open (KOKAI) No. 2002-241323). However, the deca-addition fullerene derivatives of $C_{60}$ skeleton have a π-electron conjugated structure of a 40 electron system, and, therefore, are largely different in electron state thereof from those of the fullerene itself and penta-addition fullerene derivatives. Further, the present inventors have successfully synthesized and reported triaddition $C_{70}$ derivatives having a π-electron conjugated structure of a 66 electron system which are smaller in number of addition of organic groups than that of the penta-addition fullerene derivatives (refer to Japanese Patent Application Laid-open (KOKAI) No. 11-255508).

Various fullerene derivatives mentioned above have such a unique structure that organic groups are exclusively added to specific sites of fullerene skeleton, and have the long π-electron conjugated structure. For this reason, there have been raised much interests in electrochemical properties of these fullerene derivatives.

In order to apply the above fullerene derivatives to electronic materials, ligands of metal complexes, etc., and use these derivatives as intermediate products for other fullerene derivatives, the fullerene derivatives preferably show a high solubility in organic solvents. Although some of the penta-addition fullerene derivatives have a higher solubility in organic solvents than that of the unsubstituted fullerene, it has been further required to provide the fullerene derivatives capable of exhibiting a still higher solubility in various organic solvents.

Also, it has been reported that, for example, $C_{60}(Ph)_5H$ suffers from oxidation during storage ("Chem. Commun.", p. 1579 (1997)). Thus, in general, these multiple-addition fullerene derivatives tend to be unstable in air.

SUMMARY OF THE INVENTION

An object of the present invention is to provide novel fullerene derivatives and processes for producing these fullerene derivatives, and more specifically develop and provide fullerene derivatives having a good stability in air, a high solubility in organic solvents and excellent electronic properties unlike conventionally known fullerene derivatives, by adding thereto organic groups that are different in number, kind and steric configuration from each other.

As a result of the present inventors' earnest studies for solving the above problems, it has been found that the above objects can be achieved by fullerene derivatives having a specific partial structure on a fullerene skeleton thereof. The present invention has been attained on the basis of the above finding.

To accomplish the aims, in a first aspect of the present invention, there is provided a fullerene derivative having a partial structure represented by the general formula (I):

wherein $C^1$ to $C^8$ are carbon atoms constituting a fullerene skeleton in which $C^6$ to $C^8$ are independently bonded to an organic group having 1 to 50 carbon atoms, and $C^1$ is bonded to a substituted or unsubstituted alkyl group having 1 to 20 carbon atoms.

In a second aspect of the present invention, there is provided a fullerene derivative represented by the general formula:

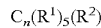

wherein $C_n$ is a fullerene skeleton, and the number of carbon atoms of $C_n$ is n; $R^1$ groups are independently an organic group having 1 to 50 carbon atoms; and $R^2$ is a substituted or unsubstituted alkyl group having 1 to 20 carbon atoms.

In a third aspect of the present invention, there is provided the fullerene derivative having the partial structure represented by the above general formula (I), which is unsusceptible to oxidation.

In a fourth aspect of the present invention, there is provided a process for producing the above fullerene derivative, which comprises the step of alkylating a fullerene derivative having hydrogen atoms on a cyclopentadiene ring of a fullerene skeleton thereof.

DETAILED DESCRIPTION OF THE INVENTION

Figure 1:
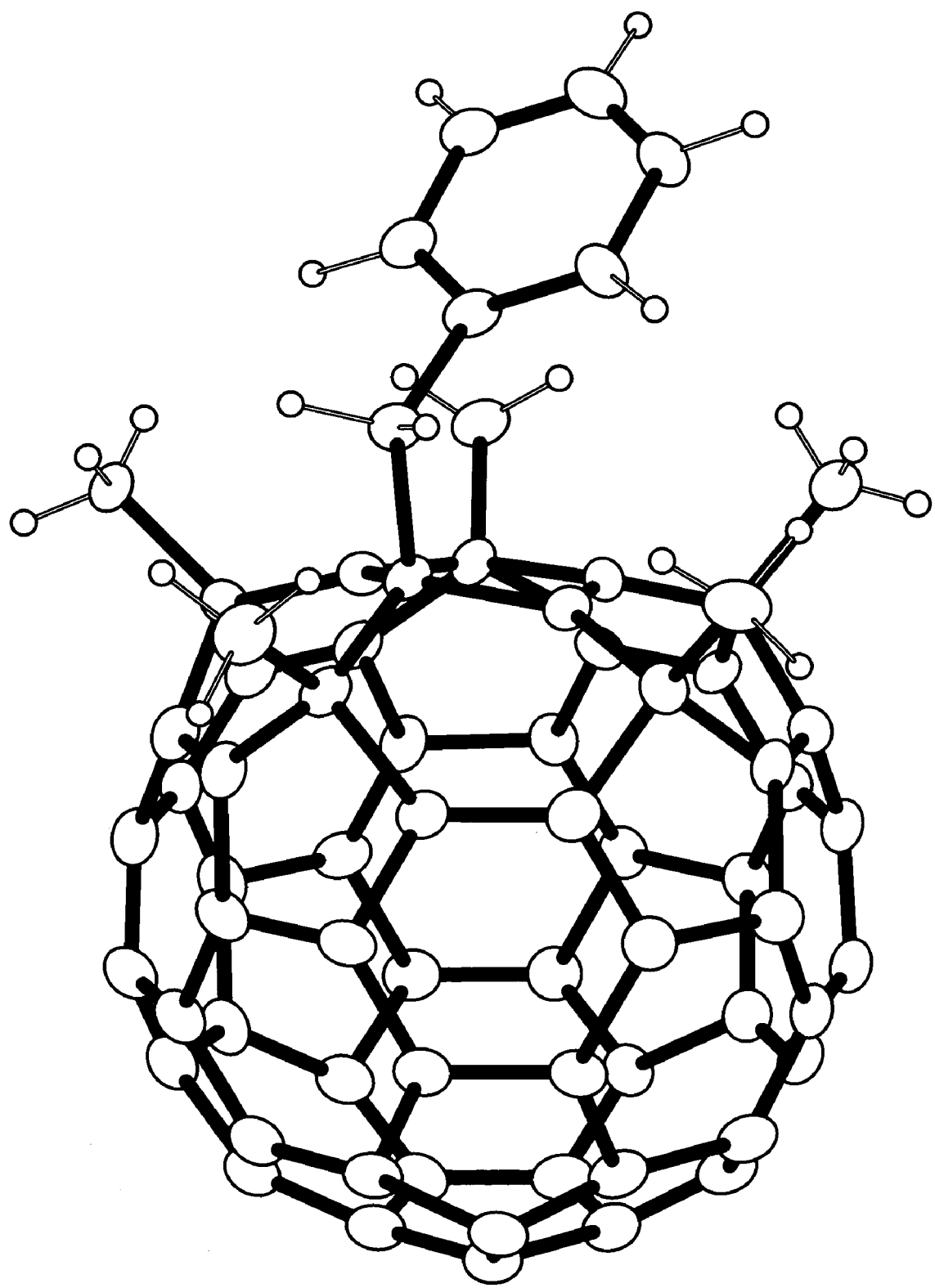
FIG. 1 is a view showing the results of X-ray crystal structural analysis of $C_{60}Me_5CH_2Ph$.

The present invention will be described in detail below with respect to preferred embodiments. However, the present invention is not limited to the preferred embodiments, and various modifications and changes are possible within the scope of the present invention.

The fullerene derivatives of the present invention have a partial structure on a fullerene skeleton thereof which is represented by the following general formula (I):

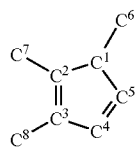

wherein $C^1$ to $C^8$ are carbon atoms constituting a fullerene skeleton in which $C^6$ to $C^8$ are independently bonded to an organic group having 1 to 50 carbon atoms, and $C^1$ is bonded to a substituted or unsubstituted alkyl group having 1 to 20 carbon atoms.

The fullerene is a carbon cluster having a closed shell structure. Usually, the number of carbon atoms contained in the fullerene is 60 to 130. Examples of the fullerene may include fullerene $C_{60}$, fullerene $C_{70}$, fullerene $C_{76}$, fullerene $C_{78}$, fullerene $C_{82}$, fullerene $C_{84}$, fullerene $C_{90}$, fullerene $C_{94}$ and fullerene $C_{96}$ as well as carbon clusters having a still higher number of carbon atoms.

Also, the fullerene derivatives of the present invention generally involve compounds and compositions having organic groups on a fullerene skeleton thereof. That is, the fullerene derivatives of the present invention also include fullerene derivatives containing metals or compounds that are incorporated within a fullerene skeleton thereof, complexes of fullerene derivatives with other metal atoms or compounds, or the like, as long as these derivatives have organic groups on a fullerene skeleton thereof. Among these fullerene derivatives, preferred are derivatives of fullerene $C_{60}$ and fullerene $C_{70}$, and more preferred are derivatives of fullerene $C_{60}$ because of availability of raw fullerenes for the main products upon production thereof. Meanwhile, in the following descriptions, the fullerene skeleton having n carbon atoms is appropriately represented by the general formula $C_n$.

In the general formula (I), $C^1$ to $C^8$ are independently bonded to an organic group having 1 to 50 carbon atoms (hereinafter appropriately referred to as "$R^1$"). $R^1$ may be any organic group unless the group adversely affect excellent properties of the fullerene derivatives of the present invention. Any optional organic group as $R^1$ may be added to the fullerene skeleton according to aimed properties of the fullerene derivatives. For example, in order to obtain fullerene derivatives that are unsusceptible to air oxidation, such organic groups that hardly oxidized in air are preferably added to the fullerene skeleton. Meanwhile, a plurality of the $R^1$ groups may be independently the same or different from each other, but are preferably identical to each other from the standpoint of facilitated synthesis of the fullerene derivatives.

Examples of $R^1$ may usually include linear or branched chain-like alkyl groups such as methyl, ethyl, propyl and isopropyl; cyclic alkyl groups such as cyclopropyl, cyclopentyl and cyclohexyl; linear or branched chain-like alkenyl groups such as vinyl, propenyl and hexenyl; cyclic alkenyl groups such as cyclopentenyl and cyclohexenyl; alkynyl groups such as ethynyl, methylethynyl and 1-propionyl; aryl groups such as phenyl, naphthyl, toluyl and methoxyphenyl; aralkyl groups such as benzyl and phenylethyl; heterocyclic groups such as thienyl, pyridyl and furyl; and groups formed by further bonding substituent groups to the above groups. Among these groups, preferred are alkyl groups and aryl groups, and more preferred are methyl and phenyl.

The substituent groups that may be bonded to the above-exemplified groups may be any groups unless these groups adversely affect excellent properties of the fullerene derivatives of the present invention. Specific examples of the substituent groups may include alkyl groups, aryl groups, alkoxy groups, hydroxyl, amino, carboxyl, halogen atoms, thiol, thioether, alkoxyphenyl groups, organosilicon groups or the like.

That is, as $R^1$, preferred are alkyl groups and aryl groups, more preferred are chain-like alkyl groups and aryl groups, and especially preferred are methyl and phenyl. Also, in order to impart liquid crystal characteristics to the fullerene derivatives, (long-chain alkoxy-substituted benzoyloxy)phenyl is preferable as $R^1$, and from the standpoint of a high solubility in organic solvents, organosilicon groups such as trimethylsilylmethyl and trimethylsilylethynyl are preferable as $R^1$.

The number of carbon atoms contained in $R^1$ is a total number of carbon atoms inclusive of the number of carbon atoms in the substituent groups bonded thereto. When the number of carbon atoms contained in $R^1$ is too large, it may be usually difficult to produce fullerene derivatives as raw materials for the fullerene derivatives of the present invention. The number of carbon atoms contained in $R^1$ is preferably 1 to 20.

In the general formula (I), $C^1$ is bonded to an alkyl group having 1 to 20 carbon atoms (hereinafter appropriately referred to as "$R^2$"). Any alkyl groups may be used as $R^2$ unless these groups adversely affect excellent properties of the fullerene derivatives of the present invention. In particular, in order to obtain fullerene derivatives that are oxidation-unsusceptible in air, the alkyl groups preferably contain bonds that are not oxidizable in air, for example, non-aromatic unsaturated bonds.

Specific examples of the alkyl groups as $R^2$ may include linear or branched chain-like alkyl groups such as methyl, ethyl, propyl and isopropyl; and cyclic alkyl groups such as cyclopropyl, cyclopentyl and cyclohexyl.

These alkyl groups may have substituent groups unless these substituent groups adversely affect excellent properties of the fullerene derivatives of the present invention. Examples of the substituent groups may include aryl groups, alkoxy groups, hydroxyl, amino, carboxyl, alkoxycarbonyl groups, halogen atoms or the like. These substituent groups may have further substituent groups.

The number of carbon atoms contained in $R^2$ is a total number of carbon atoms inclusive of the number of carbon atoms in the substituent groups thereof. When the number of carbon atoms contained in $R^2$ is too large, it may be usually difficult to bond the alkyl group $R^2$ to the fullerene skeleton. The number of carbon atoms contained in the alkyl group $R^2$ is preferably not more than 10. On the other hand, when the number of carbon atoms contained in $R^2$ is too small, the resultant fullerene derivatives tend to be deteriorated in solubility in organic solvents. From the standpoint of good solubility in organic solvents, the number of carbon atoms contained in $R^2$ is preferably not less than 4, more preferably not less than 6.

Among these groups, preferred as $R^2$ are alkyl groups such as methyl, ethyl, propyl, butyl, pentyl, hexyl, heptyl, octyl, nonyl and decyl; hydroxyalkyl groups such as hydroxyethyl, hydroxypropyl and hydroxybutyl; alkenyl groups such as allyl; aralkyl groups such as benzyl, p-methoxybenzyl and phenylethyl; or the like. For example, in order to obtain fullerene derivatives that are oxidizable in air, $R^2$ preferably contains no substituent groups that tend to be readily oxidizable in air, for example, such as alkenyl groups and alkynyl groups. Also, in order to obtain fullerene derivatives exhibiting a high solubility in alcohols or ester-based solvents or allow further substitution to other functional groups, the alkyl groups $R^2$ preferably contain polar functional groups such as hydroxyl group or alkoxycarbonyl group.

Examples of the fullerene derivatives having a partial structure represented by the general formula (I) on a fullerene skeleton thereof may include tetra-addition fullerene derivatives represented by the general formula $C_n(R^1)_3(R^2)$, hexa-addition fullerene derivatives represented by the general formula $C_n(R^1)_5(R^2)$, octa-addition fullerene derivatives represented by the general formula $C_n(R^1)_6(R^2)_2$, deca-addition fullerene derivatives represented by the general formula $C_n(R^1)_8(R^2)_2$, dodeca-addition fullerene derivatives represented by the general formula $C_n(R^1)_{10}(R^2)_2$, etc. Of these fullerene derivatives, preferred are hexa-addition fullerene derivatives represented by the general formula $C_n(R^1)_5(R^2)$ wherein $R^1$ and $R^2$ are the same as defined above.

Among the above fullerene derivatives, hexa-addition fullerene derivatives represented by the general formula $C_n(R^1)_5(R^2)$, deca-addition fullerene derivatives represented by the general formula $C_n(R^1)_8(R^2)_2$ and dodeca-addition fullerene derivatives represented by the general formula $C_n(R^1)_{10}(R^2)_2$ are preferably those having a partial structure represented by the following general formula (II) on a fullerene skeleton thereof, whereas tetra-addition fullerene derivatives represented by the general formula $C_n(R^1)_3(R^2)$, octa-addition fullerene derivatives represented by the general formula $C_n(R^1)_6(R^2)_2$ and deca-addition fullerene derivatives represented by the general formula $C_n(R^1)_8(R^2)_2$ are preferably those having a partial structure represented by the following general formula (I) on a fullerene skeleton thereof.

Meanwhile, the octa-addition fullerene derivatives represented by the general formula $C_n(R^1)_6(R^2)_2$ preferably have two partial structures represented by the following general formula (I); the deca-addition fullerene derivatives represented by the general formula $C_n(R^1)_8(R^2)_2$ preferably have one partial structure represented by the following general formula (I) and one partial structure represented by the following general formula (II); and the dodeca-addition fullerene derivatives represented by the general formula $C_n(R^1)_{10}(R^2)_2$ preferably have two partial structures represented by the following general formula (II).

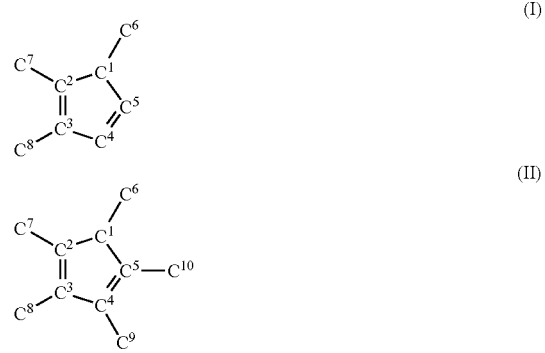

wherein $C^1$ to $C^8$ are carbon atoms constituting a fullerene skeleton in which $C^6$ to $C^8$ in the general formula (I) and $C^6$ to $C^{10}$ in the general formula (II) are independently bonded to an organic group having 1 to 50 carbon atoms, and $C^1$ in the general formulae (I) and (II) is bonded to a substituted or unsubstituted alkyl group having 1 to 20 carbon atoms.

Next, the processes for producing the fullerene derivatives according to the present invention are explained though the present invention is not limited to these processes.

The fullerene derivatives of the present invention may be produced, for example, by the following three methods (1) to (3).

(1) Alkylating a fullerene derivative having hydrogen atoms on a cyclopentadiene ring of a fullerene skeleton thereof (hereinafter appropriately referred to as a "fullerene derivative having hydrogen atoms").

(2) Reacting the above fullerene derivative having hydrogen atoms with a transition metal complex having a $\eta^3$ type ligand.

(3) Reacting a fullerene derivative having halogen atoms on a cyclopentadiene ring of a fullerene skeleton thereof (hereinafter appropriately referred to as a "fullerene derivative having halogen atoms") with an arylalkane compound in the presence of a transition metal complex wherein the valence number of transition metal is 2 or less.

First, the alkylation reaction (1) of the fullerene derivative having hydrogen atoms is explained. More specifically, the fullerene derivatives of the present invention are produced by alkylating the fullerene derivative having hydrogen atoms.

The fullerene derivative having hydrogen atoms means such a fullerene derivative represented by the general formula (I) wherein $R^1$ is the same as defined above, and $R^2$ is hydrogen. Examples of the fullerene derivative having hydrogen atoms may include tri-addition $C_{70}$ derivatives having one partial structure represented by the following general formula (A) on the fullerene $C_{70}$ skeleton, penta-addition $C_{60}$ derivatives having one partial structure represented by the following general formula (B) on the fullerene $C_{60}$ skeleton, hexa-addition $C_{70}$ derivatives having two partial structures represented by the following general formula (A) on the fullerene $C_{70}$ skeleton, octa-addition $C_{60}$ derivatives having one partial structure represented by the following general formula (A) and one partial structure represented by the following general formula (B) on the fullerene $C_{60}$ skeleton, deca-addition $C_{60}$ derivatives having two partial structures represented by the following general formula (B) on the fullerene $C_{60}$ skeleton, or the like.

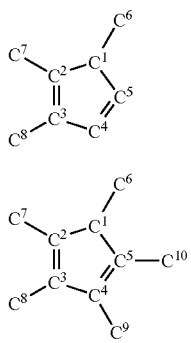

Partial structure (A)

Partial structure (B)

wherein $C^1$ to $C^{10}$ are carbon atoms constituting a fullerene skeleton in which $C^6$ to $C^8$ in the general formula (A) and $C^6$ to $C^{10}$ in the general formula (B) are independently bonded to an organic group having 1 to 50 carbon atoms, and $C^1$ in the general formulae (A) and (B) is bonded to a hydrogen atom.

The processes for production of various fullerene derivative having hydrogen atoms have been already established, and such fullerene derivative having hydrogen atoms can be produced by reacting fullerene with an organocopper reagent. That is, the fullerene derivative having hydrogen atoms are usually synthesized by the reaction between an organocopper reagent and fullerene. The organocopper reagent may be prepared by a Grignard reagent corresponding to the organic group to be introduced to carbon atoms adjacent to the cyclopentadiene ring of the fullerene skeleton, specifically a compound selected from $R^1MgCl$, $R^1MgBr$ and $R^1MgI$ wherein $R^1$ is the same as defined above, and a monovalent copper reagent such as $CuBrSMe_2$. Alternatively, the fullerene derivative having hydrogen atoms may also be prepared by introducing a group capable of being converted into $R^1$ by the same method as described above and then converting the group into $R^1$.

The specific conditions for production of the fullerene derivative having hydrogen atoms are described, for example, in Japanese Patent Application Laid-open (KOKAI) Nos. 10-167994, 11-255508, 11-255509, 2002-241323, 2003-146915 and 2003-212881, "Org. Lett.", 2, p. 1919 (2000), "J. Organomet. Chem.", 652, p. 31 (2002), "J. Mater. Chem.", 12, p. 2109 (2002), "Org. Lett.", 5, p. 4461 (2003), and "J. Am. Chem. Soc.", 126, p. 432 (2004).

In particular, the hexa-addition $C_{70}$ derivatives, octa-addition $C_{60}$ derivatives and deca-addition $C_{60}$ derivatives can be produced by conducting the above reaction in a specific reaction solvent, more concretely, pyridines.

In order to synthesize such fullerene derivative having hydrogen atoms containing groups such as hydroxy, amino, thiol, carbonyl and alkoxycarbonyl which make it difficult to prepare the corresponding organocopper reagent or tends to disturb the reaction with the organocopper reagent, an organocopper reagent is first prepared from a Grignard reagent containing a functional group as a precursor of the above respective groups, and then reacted with fullerene, followed by converting the functional group into the aimed group by an appropriate conversion reaction. More specifically, when the aimed fullerene derivative having hydrogen atoms contain functional groups such as hydroxyl, amino and thiol, these functional groups are preferably protected with ether type protective groups such as methoxymethyl, ethoxymethyl and tetrahydropyranyl, or silicon type protective groups such as trimethylsilyl and t-butyldimethylsilyl. Also, when the aimed fullerene derivative having hydrogen atoms contain functional groups such as carboxyl and alkoxycarbonyl, precursors thereof in the form of ortho-esters, etc., are added by penta-addition reaction, and then converted into the desired functional groups by deprotection. Meanwhile, the conversion reaction into the desired functional groups may be conducted after the below-mentioned alkylation reaction.

The alkylation reaction of the fullerene derivative having hydrogen atoms may be usually performed by reacting the fullerene derivative having hydrogen atoms with an alkylating agent represented by the general formula:

$$R^2-X$$

wherein $R^2$ is the same as defined above; and X is a leaving group, in the presence of a base. Meanwhile, the reactions of anions of the fullerene derivatives with an electrophilic reagent including the alkylation reaction of the fullerene derivatives are described, for example, in Japanese Patent Application Laid-open (KOKAI) No. 2003-212881.

Examples of the leaving group X in the alkylating agent may include halogen atoms such as Cl, Br and I, acyloxy groups such as acetoxy and trifluoroacetoxy, sulfonyloxy groups such as methanesulfonyloxy, benzenesulfonyloxy and toluenesulfonyloxy which can be used as a leaving group in nucleophilic substitution reaction.

The alkylating agent is a compound formed by bonding the above $R^2$ and X to each other. Specific examples of the alkylating agent may include halogenated alkyl compounds such as methyl iodide, ethyl bromide, propyl bromide, butyl bromide, pentyl bromide, hexyl bromide, heptyl bromide and octyl bromide; halogenated alkenyl compounds such as allyl chloride and allyl bromide; halogenated aralkyl compounds such as benzyl chloride and phenylethyl chlorides; halogenated alcohols such as 2-bromoethanol, 3-bromopropanol, 4-bromobutanol and 5-bromopentanol; halogenated fatty acid esters such as ethyl 3-bromopropionate and ethyl 4-iodobutyrate; or the like.

Meanwhile, in the case where $R^2$ of the alkylating agent $R^2$—X is such a group that disturbs the alkylation reaction or is unstable under the reaction conditions, the alkylation reaction is conducted using an alkylating agent in which $R^2$ thereof is protected with an appropriate protective group, and then after completion of the alkylation reaction, the protective group is removed to regenerate the aimed functional group.

The ratio of the alkylating agent per a hydrogen atom contained in the fullerene derivative having hydrogen atoms is usually 1 to 1000 mole, preferably 1 to 10 mole. When the amount of the alkylating agent used is too large, the production costs tend to be undesirably increased. When the amount of the alkylating agent used is too small, it may be difficult to attain a sufficient reaction rate.

As the base, there may be used any basic compounds that can abstract a proton from a cyclopentadiene moiety of the fullerene derivative having hydrogen atoms and forming cyclopentadienyl anions in the reaction system. Examples of the base may include basic compounds such as metal alkoxides, e.g., sodium methoxide, potassium-t-butoxide and sodium-t-butoxide, and quaternary ammonium hydroxides, e.g., tetramethylammonium hydroxide, tetrabutylammonium hydroxide and trimethylbenzylammonium hydroxide. The mole ratio of the base per a hydrogen atom contained in the fullerene derivative having hydrogen atoms is usually 1 to 5. When the amount of the base used is too large, undesirable side reactions tend to proceed. When the amount of the base used is too small, the reaction rate and conversion rate tend to become insufficient.

Upon the alkylation reaction of the fullerene derivative having hydrogen atoms, the order of addition of the raw materials as well as the base, fullerene derivatives having hydrogen atoms, etc., is not particularly limited as long as the alkylation reaction can be properly caused. Usually, the alkylation reaction is conducted by first mixing the fullerene derivative having hydrogen atoms and the base with each other in an appropriate solvent, and then adding the alkylating agent to the resultant mixture. As the reaction solvent, there may be used any optional solvents as long as the aimed alkylation reaction proceeds at a sufficient reaction rate. Usually, ether solvents such as diethyl ether, dibutyl ether and tetrahydrofuran (THF) are preferably used as the reaction solvent.

The alkylating agent, base and solvent used in the alkylation reaction of the fullerene derivative having hydrogen atoms may be respectively used singly or in the form of a mixture of any two or more thereof. Further, the alkylation reaction may be conducted in the presence of substances other than the fullerene derivative having hydrogen atoms, alkylating agent, base and solvent unless the existence of the substances adversely affects the alkylation reaction.

The conditions of the alkylation reaction are not particularly limited as long as the alkylation reaction is properly caused. Usually, the fullerene derivative having hydrogen atoms and the base are mixed together at a temperature of 0 to 50° C., preferably at room temperature (15 to 30° C.) for several minutes to one hour, preferably 10 to 30 min. Then, the alkylating agent is added to the resultant mixture, and reacted therewith for several minutes to several hours, preferably 5 minutes to 2 hours.

After completion of the alkylation reaction, the resultant fullerene derivatives of the present invention are usually isolated from the reaction solution by ordinary methods. For example, after stopping the reaction by dropping an aqueous solution of ammonium chloride, etc., to the reaction solution, the resultant reaction solution is directly passed through a silica gel column using an appropriate solvent to remove inorganic substances therefrom, and then the solvent is distilled off to isolate the reaction product from the reaction solution. The thus obtained fullerene derivatives may be purified, if required, by appropriate methods such as high performance liquid chromatography (HPLC) and column chromatography. The yield of the reaction product isolated is usually not less than 80% when the reaction is performed under the above preferred conditions.

The fullerene derivative having hydrogen atoms have such a structure that organic groups are bonded to carbon atoms adjacent to carbon atoms on a cyclopentadiene ring thereof. For this reason, it has been conventionally considered that the carbon atoms on the cyclopentadiene ring have a low reactivity due to steric hindrance and, therefore, cannot be alkylated. However, according to the present invention, it has been unexpectedly found that the aimed fullerene derivatives are obtained by subjecting the fullerene derivative having hydrogen atoms to alkylation reaction.

Next, the process for producing the fullerene derivatives by the method (2) of reacting the fullerene derivative having hydrogen atoms with a transition metal complex having a $\eta^3$ type ligand, is explained. In this process, the transition metal complex having a $\eta^3$ type ligand is used instead of the alkylating agent used in the reaction of the method (1).

The kinds of $\eta^3$ type ligand and transition metal contained in the complex are not particularly limited as long as the complex is stable and the aimed reaction properly proceeds.

Specific examples of the $\eta^3$ type ligand may include those ligands containing allyl, crotyl, methallyl or the like. In the reaction of the method (2), the allyl, crotyl, methallyl, etc., are introduced to the fullerene skeleton.

The transition metals used in the complex is preferably selected from Group 10 transition metals, and the more preferred transition metal is palladium (Pd).

The number and kinds of ligands other than the $\eta^3$ type ligand which may be contained in the transition metal complex vary depending upon kinds of transition metals used therein. When the Group 10 transition metals are used, monovalent anion type ligands such as halogen atoms are preferably used as the other ligands. Of these halogen atoms, chlorine (Cl) is more preferred in view of good availability of the raw complexes. Also, when the divalent Group 10 transition metals are used, the number of the anion type ligands is preferably one.

The especially preferred transition metal complex having a $\eta^3$ type ligand is [PdCl($\eta^3$-allyl)]$_2$ from the standpoint of availability of the raw material.

The transition metal complex having a $\eta^3$ type ligand is used in an amount of 1 to 5 mole, preferably 1 to 2 mole per one halogen atom contained in the fullerene derivative having hydrogen atoms. The reaction temperature, reaction time, solvent and post-treatments used in the method (2) are the substantially same as those used in the above alkylation reaction (1) using the alkylating agent. When the reaction is conducted under the above preferred conditions, the yield of the aimed fullerene derivatives is usually not less than 5%.

Although the reaction mechanism of the reaction of the method (2) is not clearly known, it is considered that the reaction proceeds by causing a nucleophilic reaction of the anions of the produced fullerene derivatives to the $\eta^3$ type ligand moiety of the transition metal complex.

Next, the process for producing the fullerene derivatives by the method (3) of reacting a fullerene derivative having hydrogen atoms on a cyclopentadiene ring of a fullerene skeleton thereof with an arylalkane compound in the presence of a transition metal complex wherein the valence number of transition metal is 2 or less, is explained.

The fullerene derivative having hydrogen atoms on a cyclopentadiene ring of a fullerene skeleton thereof is produced by mixing the fullerene derivative having hydrogen atoms with a base and then reacting the resultant mixture with a halogenating agent (refer to Japanese Patent Application Laid-open No. 2002-241389). The base used in the above halogenation reaction may be selected from any basic compounds as long as the basic compounds are capable of releasing hydrogen atom from a cyclopentadienyl moiety of the fullerene derivative having hydrogen atoms and forming cyclopentadienyl anions in the reaction system as similarly described as to the base used in the above alkylation reaction (1). Specific examples of the base may include basic compounds such as metal alkoxides, e.g., sodium methoxide, potassium-t-butoxide and sodium-t-butoxide, and quaternary ammonium hydroxides, e.g., tetramethylammonium hydroxide, tetrabutylammonium hydroxide and trimethylbenzylammonium hydroxide.

Examples of the halogenating agent may include halogenating reagents such as chlorine, bromine, iodine, N-bromosuccinimide and N-chlorosuccinimide, etc. Of these halogenating agents, preferred is N-bromosuccinimide.

The arylalkane compound is an aromatic hydrocarbon having an alkyl group on an aromatic ring thereof and a hydrogen atom bonded to an α-position (i.e., benzyl position) of the aryl group. The arylalkane compound is usually represented by the general formula:

$$Ar\text{---}CH(R^4)(R^5)$$

wherein Ar is a substituted or unsubstituted aryl group; and $R^4$ and $R^5$ are independently a hydrogen atom or an alkyl group having 1 to 4 carbon atoms.

The aryl group Ar is not particularly limited as long as the aimed reaction properly proceeds, and may be either an aromatic hydrocarbon or a heteroaromatic ring as long as these groups exhibit aromatic properties. Further, the aromatic hydrocarbon and heteroaromatic ring may further have substituent groups. Specific examples of the aromatic hydrocarbon may include phenyl, naphthyl or the like. Specific examples of the substituent groups may include halogen atoms, alkoxy or the like.

$R^4$ and $R^5$ may be respectively a hydrogen atom or alkyl groups such as methyl, ethyl, propyl, isopropyl, butyl, isobutyl and sec-butyl. When the number of carbon atoms contained in $R^4$ and $R^5$ is too large, the reactivity of the aimed reaction tends to be deteriorated. Meanwhile, although $R^4$ and $R^5$ may be the same or different from each other, it is preferred that either $R^4$ and $R^5$ is a hydrogen atom.

Specific examples of the arylalkane compound may include toluene, xylene, ethylbenzene, isopropylbenzene, isobutylbenzene, methoxytoluenes or the like. Of these compounds, preferred are ethylbenzene and methoxytoluenes.

The arylalkane compound is usually used in a sufficiently excess amount, specifically, the mole ratio of the arylalkane compound and fullerene derivatives having halogen atoms is about from 100 to 10000. When the amount of the arylalkane compound used is too small, the reactivity tends to be deteriorated.

The transition metals contained in the transition metal complex wherein the valence number of transition metal is 2 or less are usually those metals belonging to Group 8 to 10 of the Periodic Table. The use of the higher-valent transition metal complex tends to inhibit the reaction from proceeding sufficiently. Specific examples of the transition metal complex wherein the valence number of transition metal is 2 or less may include $FeCl(CO)_2$, $RuCl_2(PPh_3)_3$, polymeric [Ru(cod)Cl$_2$], [Rh(coe)$_2$Cl]$_2$, [Ir(coe)$_2$Cl]$_2$, Ni(cod)$_2$, NiCl$_2$, PdCl$_2$, PtCl$_2$ or the like, wherein "coe" represents cyclooctene; and "cod" represents 1,5-cyclooctadiene. Of these complexes, [Rh(coe)$_2$Cl]$_2$ and [Ir(coe)$_2$Cl]$_2$ are preferred in view of stability and availability. The above lower-valent transition metal complex is usually used in an amount of 0.01 to 3 mole per a mole of fullerene derivative having halogen atom. When the amount of the transition metal complex used is too large, the production costs tend to be increased. When the amount of the transition metal complex used is too small, the reaction rate tends to be sometimes insufficient.

The reaction between the fullerene derivatives having halogen atom and the arylalkane compound is usually conducted by mixing the halogen-containing fullerene derivatives with the lower-valent transition metal complex in the presence of a sufficiently excess amount of the arylalkane compound under stirring, etc. The reaction temperature is preferably 0 to 100° C., and the reaction time is preferably one hour to several days. When the reaction temperature is too low, the reaction rate tends to be decreased. When the reaction temperature is too high, undesirable side reactions due to decomposition of the raw materials, the reaction products, etc., tend to be caused.

The aimed products may be usually isolated after the reaction by removing inorganic substances such as the transition metal compounds using a silica gel column or the like. In addition, the resultant products may be purified, if required, by HPLC, etc.

The yield of the aimed products is usually not less than 20% as long as the reaction is conducted under the above preferred conditions.

Although the reaction mechanism is not clearly known, it is considered that the reaction proceeds while the lower-valent transition metal complex is oxidatively added to the carbon-halogen bond of the halogen-containing fullerene derivatives.

The structures of the fullerene derivatives of the present invention may be usually determined by proton nuclear magnetic resonance spectrometry (hereinafter referred to merely as "$^1$H-NMR"), carbon nuclear magnetic resonance spectrometry (hereinafter referred to merely as "$^{13}$C-NMR"), infrared absorption spectrum method (hereinafter referred to merely as "IR"), mass spectrometry (hereinafter referred to merely as "MS"), and ordinary organic analysis methods such as elemental analysis. In addition, when the fullerene derivatives have a good crystalline structure, the structure thereof may also be determined by X-ray crystal diffraction method.

Many of the fullerene derivatives of the present invention tend to generally exhibit a higher solubility in organic solvents as compared to unsubstituted fullerenes and fullerene derivatives in which carbon atoms on a cyclopentadiene ring thereof are bonded to hydrogen atoms, though it varies depending upon kinds and number of the substituent groups. For example, as compared with the fullerene derivatives in which carbon atoms on a cyclopentadiene ring thereof are bonded to hydrogen atoms, the fullerene derivatives of the present invention in which the hydrogen atoms are substituted with the alkyl group having a hydroxyl or ester group, usually exhibit a higher solubility in polar solvents such as tetrahydrofuran and dimethylformamide, more specifically, the solubility in tetrahydrofuran is sometimes 3 or more times that of the conventional fullerene derivatives, and the solubility in dimethylformamide is sometimes 5 or more times that of the conventional fullerene derivatives.

Further, many of the fullerene derivatives of the present invention tend to generally exhibit a higher stability in air as compared to the fullerene derivative having hydrogen atoms, etc., though it varies depending upon kinds and number of the substituent groups. The high stability in air is practically extremely useful to use the fullerene derivative in the form of a solution or preserve the fullerene derivatives in the form of a powder or a solution for a long period of time.

The stability in air of the fullerene derivatives of the present invention may be confirmed, for example, by analyzing the change in quality thereof with time by HPLC. More specifically, the stability in air can be determined as follows. That is, a toluene solution of the fullerene derivatives of the present invention which is allowed to stand in air at room temperature, is subjected to HPLC using an octadecyl-bonded silica gel column (hereinafter referred to merely as "ODS" column), an eluent composed of toluene and methanol and a UV wavelength of 290 nm to measure the rate of reduction in area ratio of a peak attributed to the fullerene derivatives to whole peaks as observed. Concretely, it can be evaluated by the stability in air of solution of fullerene derivative according to the present invention to the solution of same fullerene derivative to the present one except for having a hydrogen atom on cyclopentadiene ring of fullerene skeleton, for example, a $C_{60}Ph_5CH_3$ solution to a $C_{60}Ph_5H$ solution (Ph represents a phenyl group). For example, the rate of reduction in peak area ratio of the fullerene derivatives according to the present invention is usually 1/20 or lower, preferably 1/100 or lower than that of the case where one having a hydrogen atom on cyclopentadiene ring, namely $C_{60}Ph_5H$, is used under the same conditions.

It is not clearly known why the fullerene derivatives of the present invention can exhibit a high stability in air. However, in view of such a fact that the conventionally known multiple-addition fullerene derivatives are generally susceptible to oxidation, it is considered that the fullerene derivatives in which carbon atoms on a cyclopentadienyl moiety of the fullerene skeleton are bonded to hydrogen atoms have a C—H bond that tends to be readily reacted with oxygen, whereas the fullerene derivatives of the present invention have no reactive C—H bond and, therefore, can exhibit a high stability in air. Meanwhile, a further reason why the fullerene derivatives in which carbon atoms on a cyclopentadienyl moiety of the fullerene skeleton are bonded to hydrogen atoms tend to undergo the air oxidation, is considered to be epoxidation of olefins in the cyclopentadienyl moiety, etc. On the contrary, the fullerene derivatives of the present invention are substantially or completely free from these adverse influences and, therefore, can unexpectedly exhibit an excellent stability in air.

Thus, it is expected that the fullerene derivatives of the present invention are applicable to novel electronic conductive materials, semiconductors, bioactive substances, etc., because these derivatives have different properties from those of the conventionally known fullerene derivatives. In particular, among these fullerene derivatives, those that are hardly oxidized in air, are more preferred in view of good stability in air when used in various applications. In addition, the fullerene derivatives containing polar functional groups such as hydroxyl and alkoxycarbonyl groups are also useful as raw materials for various other fullerene derivatives since the polar functional groups can be converted into other functional groups. Further, the fullerene derivatives of the present invention contain many organic groups as well as have a π-electron conjugated structure in a fullerene skeleton thereof and, therefore, can show a more excellent electron donating and accepting ability than that of the conventionally known fullerene derivatives to which a similar number of organic groups are added. Therefore, in the fullerene derivatives of the present invention, the occurrence of donation and acceptance of electrons (oxidation-reduction behavior) tends to be more readily controlled by varying the kinds and number of organic groups, so that it is possible to use these fullerene derivatives in broader applications such as electronic materials requiring a good electron donating and accepting ability.

The present application is based on Japanese patent application No. JP 2003-154418 which was filed in Japan on May 30, 2004 and is incorporated by reference herein in its entirety.

EXAMPLES

The present invention will be described in more detail by the following examples and comparative examples. However, the following examples are only illustrative and not intended to limit the scope of the present invention thereto.

Meanwhile, in the following examples and comparative examples, a methyl group is represented by Me, and a phenyl group is represented by Ph.

Example 1

Production of 1-(n-octyl)-6,9,12,15,18-pentamethyl-1, 6,9,12,15,18-hexahydro-($C_{60}$—$I_h$)[5,6]fullerene: [$C_{60}Me_5$ ($CH_2$)$_7CH_3$]

A tetrahydrofuran solution (1.0 mol/L; 33 μL) containing 33 μmol of potassium t-butoxide was added at 25° C. to a suspension prepared by dispersing 20 mg (25 μmol) of $C_{60}Me_5H$ in 5.0 mL of tetrahydrofuran, so that a color of the reaction solution was changed from red to black. Then, 7.8 mg (0.040 mmol) of n-octyl bromide was added to the reaction solution, and the resultant mixture was stirred for one hour, followed by adding 50 μL of a saturated ammonium chloride aqueous solution thereto to stop the reaction. The obtained reaction solution was subjected to a flash chromatography using a silica gel column and an eluent containing toluene and chloroform at a ratio of 9:1, thereby obtaining 18 mg (0.020 mmol) of a red solid of 1-(n-octyl)-6,9,12,15,18-pentamethyl-1, 6,9,12,15,18-hexahydro-($C_{60}$—$I_h$)[5,6]fullerene (yield: 80%). The obtained product was subjected to instrumental analyses, and data obtained by these analyses are shown below.

$^1$H-NMR (500 MHz; solvent: $CDCl_3$):δ 0.96 (t, 3H, $CH_2C\underline{H}_3$), 1.40-1.55 (m, 10H, internal $CH_2$), 1.81 (m, 2H, $C_{60}CH_2C\underline{H}_2$), 2.20 (s, 6H, $C_{60}Me$), 2.33 (s, 6H, $C_{60}Me$), 2.39 (s, 3H, $C_{60}Me$), 2.54 (m, 2H, $C_{60}C\underline{H}_2$).

$^{13}$C-NMR (125 MHz; solvent: $CDCl_3$):δ 14.17 (1C, $CH_2\underline{C}H_3$), 22.80 (1C, $CH_2$), 22.95 (1C, $CH_2$), 24.33 (2C, $C_{60}CH_3$), 27.20 (2C, $C_{60}CH_3$), 29.34 (1C, $C_{60}CH_3$), 29.34 (1C, $CH_2$), 29.65 (1C, $CH_2$), 30.00 (1C, $CH_2$), 31.95 (1C, $CH_2$), 35.34 (1C, $CH_2$), 50.64 (2C, $CH_3\underline{C}(C_{60})$), 52.93 (2C, $CH_3\underline{C}(C_{60})$), 54.22 (1C, $CH_3\underline{C}(C_{60})$), 62.81 (1C, $CH_2\underline{C}(C_{60})$), 142.72 (2C, $C_{60}$), 143.45 (1C, $C_{60}$), 143.87 (2C, $C_{60}$), 143.91 (2C, $C_{60}$), 144.28 (2C, $C_{60}$), 144.35 (2C, $C_{60}$), 144.52 (2C, $C_{60}$), 144.62 (2C, $C_{60}$), 144.69 (2C, $C_{60}$), 144.96 (2C, $C_{60}$), 145.57 (2C, $C_{60}$), 146.05 (2C, $C_{60}$), 146.68 (1C, $C_{60}$), 146.89 (2C, $C_{60}$), 147.93 (2C, $C_{60}$), 147.82 (2C, $C_{60}$), 147.88 (2C, $C_{60}$), 147.97 (1C, $C_{60}$), 148.07 (2C, $C_{60}$), 148.29 (2C, $C_{60}$), 148.36 (2C, $C_{60}$), 148.47 (2C, $C_{60}$), 148.64 (2C, $C_{60}$), 149.57 (2C, $C_{60}$), 153.79 (2C, $C_{60}$), .155.79 (2C, $C_{60}$), 156.23 (2C, $C_{60}$), 158.03 (2C, $C_{60}$).

Atmospheric pressure chemical ionization-mass spectrometry (hereinafter referred to merely as "APCI-MS"; eluent: toluene/isopropyl alcohol=7/3): m/z=909 (M$^-$).

Example 2

Production of 1-(3-hydroxypropyl)-6,9,12,15,18-pentamethyl-1, 6,9,12,15,18-hexahydro-($C_{60}$—$I_h$)[5, 6]fullerene: [$C_{60}Me_5(CH_2)_3OH$]

A tetrahydrofuran solution (125 μL) containing 0.125 mmol of potassium t-butoxide was added at 25° C. to a suspension prepared by dispersing 40.0 mg (0.0502 mmol) of $C_{60}Me_5H$ in 10.0 mL of tetrahydrofuran, so that a color of the reaction solution was changed from red to black. Then, 20.9 mg (0.150 mmol) of 3-bromo-1-propanol was added to the reaction solution, and the resultant mixture was stirred for one hour, followed by adding 0.1 mL of a saturated ammonium chloride aqueous solution thereto to stop the reaction. The obtained reaction solution was treated by the same method as defined in Example 1 except that a mixed solvent containing toluene and chloroform at a ratio of 1:9 was used as the eluent, thereby obtaining 35.9 mg (0.0420 mmol) of a red solid of 1-(3-hydroxypropyl)-6, 9,12,15,18-pentamethyl-1,6,9,12, 15,18-hexahydro-($C_{60}$—$I_h$)[5,6]fullerene (yield: 84%). The obtained product was subjected to instrumental analyses, and data obtained by these analyses are shown below.

$^1$H-NMR (500 MHz; solvent: CDCl$_3$):δ 2.08 (m, 2H, C$_{60}$CH$_2$CH$_2$), 2.21 (s, 6H, C$_{60}$Me), 2.34 (s, 6H, C$_{60}$Me), 2.42 (s, 3H, C$_{60}$Me), 2.67 (m, 2H, C$_{60}$CH$_2$), 3.76 (brs, 1H, OH), 3.96 (brs, 2H, CH$_2$OH).

$^{13}$C-NMR (125 MHz; solvent: CDCl$_3$):δ 24.32 (2C, C$_{60}$CH$_3$), 26.46 (1C, CH$_2$), 27.35 (2C, C$_{60}$CH$_3$), 29.44 (1C, C$_{60}$CH$_3$), 31.95 (1C, CH$_2$), 50.64 (2C, CH$_3$C(C$_{60}$)), 52.94 (2C, CH$_3$C(C$_{60}$)), 54.12 (1C, CH$_3$C(C$_{60}$)), 62.54 (1C, CH$_2$C(C$_{60}$)), 63.35 (1C, CH$_2$OH), 142.74 (2C, C$_{60}$), 143.40 (2C, C$_{60}$), 143.90 (2C, C$_{60}$), 143.93 (2C, C$_{60}$), 144.30 (2C, C$_{60}$), 144.38 (2C, C$_{60}$), 144.47 (2C, C$_{60}$), 144.61 (2C, C$_{60}$), 144.84 (2C, C$_{60}$), 144.92 (2C, C$_{60}$), 145.52 (2C, C$_{60}$), 145.93 (2C, C$_{60}$), 146.69 (1C, C$_{60}$), 146.90 (2C, C$_{60}$), 146.93 (2C, C$_{60}$), 147.84 (2C, C$_{60}$), 147.90 (2C, C$_{60}$), 148.08 (2C, C$_{60}$), 148.30 (1C, C$_{60}$), 148.37 (2C, C$_{60}$), 148.48 (2C, C$_{60}$), 148.65 (2C, C$_{60}$), 148.85 (2C, C$_{60}$), 149.44 (2C, C$_{60}$), 153.67 (2C, C$_{60}$), 155.78 (2C, C$_{60}$), 156.02 (2C, C$_{60}$), 157.90 (2C, C$_{60}$).

APCI-MS(−) (eluent: toluene/isopropyl alcohol=7/3): m/z =855 (M$^-$).

Example 3

Production of 1,6,9,12,15,18-hexamethyl-1, 6,9,12, 15,18-hexahydro-(C$_{60}$—I$_h$)[5,6]fullerene: [C$_{60}$Me$_6$]

A tetrahydrofuran solution (1.0 mol/L; 28 μL) containing 28 μmol of potassium t-butoxide was added at 23° C. to a suspension prepared by dispersing 20.0 mg (25.1 μmol) of C$_{60}$Me$_5$H in 2.4 mL of tetrahydrofuran, so that a color of the reaction solution was changed from red to black. Then, 12 μL (0.13 mmol) of methyl iodide was added to the reaction solution, and the resultant mixture was stirred for 20 minutes, followed by adding 50 μL of a saturated ammonium chloride aqueous solution thereto to stop the reaction. The obtained reaction solution was filtered through a silica gel column, thereby obtaining 18 mg of a red solid of 1,6,9,12,15,18-hexamethyl-1, 6,9,12,15,18-hexahydro-(C$_{60}$—I$_h$)[5,6]fullerene (yield: 89%). The obtained product was subjected to instrumental analyses, and data obtained by these analyses are shown below.

$^1$H-NMR (400 MHz; solvent: CDCl$_3$):δ 2.25 (s, 3H, CH$_3$), 2.27 (s, 6H, CH$_3$), 2.29 (s, 6H, CH$_3$), 2.35 (s, 3H, CH$_3$).

$^{13}$C-NMR (100 MHz; solvent: CDCl$_3$):δ 24.94 (2C), 27.17 (2C), 29.56 (1C), 30.31 (1C), 50.66 (2C), 52.91 (2C), 53.26 (1C), 59.87 (1C), 142.56 (2C), 142.66 (2C), 143.34 (2C), 143.75 (2C), 143.77 (2C), 144.09 (2C), 144.19 (2C), 144.31 (2C), 144.46 (2C), 144.78 (2C), 145.33 (2C), 146.12 (2C), 146.61 (1C), 146.77 (4C), 147.68 (2C), 147.75 (1C), 147.84 (1C), 147.96 (2C), 148.15 (2C), 148.23 (2C), 148.31 (2C), 148.49 (2C), 149.46 (2C), 153.87 (2C), 155.59 (2C), 157.55 (2C), 161.01 (2C).

APCI-MS(+): m/z=810 (M$^-$).

Example 4

Production of 1-benzyl-6,9,12,15,18-pentamethyl-1, 6,9,12,15,18-hexahydro-(C$_{60}$—I$_h$)[5,6]fullerene: (C$_{60}$Me$_5$CH$_2$Ph)

A tetrahydrofuran solution (1.0 mol/L; 28 μL) containing 28.0 μmol of potassium t-butoxide was added at 23° C. to a suspension prepared by dispersing 20.7 mg (26.0 μmol) of C$_{60}$Me$_5$H in 2.0 mL of tetrahydrofuran, so that a color of the reaction solution was changed from red to black. Then, 25 μL (90 μmol) of benzyl bromide was added to the reaction solution, and the resultant mixture was stirred for 40 minutes, followed by adding 50 μL of a saturated ammonium chloride aqueous solution thereto to stop the reaction. The obtained reaction mixture was filtered through a silica gel column, thereby obtaining 20 mg of a red solid of 1-benzyl-6,9,12,15, 18-pentamethyl-1, 6,9,12,15,18-hexahydro-(C$_{60}$—I$_h$)[5,6] fullerene (yield: 86%). The obtained product was subjected to instrumental analyses, and data obtained by these analyses are shown below.

IR (powder on diamond probe; units: cm$^{-1}$): υ 2960 (s), 2917 (s), 2858 (s).

$^1$H-NMR (400 MHz; solvent: CDCl$_3$):δ 3.83 (s, 2H, CH$_2$), 2.52 (s, 3H, CH$_3$), 2.48 (s, 6H, CH$_3$), 1.81 (s, 6H, CH$_3$), 7.44 (m, 3H, p,m-C$_6$H$_5$), 7.55 (m, 2H, o-C$_6$H$_5$).

Proton-carbon two-dimensional nuclear magnetic resonance spectrometry (hereinafter referred to merely as "$^{13}$C{$^1$H}-NMR") (400 MHz; solvent: CDCl$_3$):δ 25.72 (2C, CH$_3$), 26.56 (2C, CH$_3$), 29.40 (1C, CH$_3$), 43.30 (1C, CH$_2$), 50.49 (2C, CH$_3$C), 54.17 (1C, CH$_3$C), 63.19 (1C, CH$_2$C), 126.60 (1C, p-C$_6$H$_5$), 126.73 (2C, m-C$_6$H$_5$), 132.43 (2C, o-C$_6$H$_5$), 142.69 (2C, C$_{60}$), 143.23 (2C, C$_{60}$), 143.66 (2C, C$_{60}$), 143.76 (2C, C$_{60}$), 144.11 (2C, C$_{60}$), 144.17 (2C, C$_{60}$), 144.23 (2C, C$_{60}$), 144.40 (2C, C$_{60}$), 144.63 (2C, C$_{60}$), 145.04 (2C, C$_{60}$), 145.19 (2C, C$_{60}$), 146.20 (2C, C$_{60}$), 146.76 (1C, C$_{60}$), 146.83 (2C, C$_{60}$), 147.69 (2C, C$_{60}$), 147.78 (2C, C$_{60}$), 147.93 (2C, C$_{60}$), 148.12 (2C, C$_{60}$), 148.21 (2C, C$_{60}$), 148.31 (1C, C$_{60}$), 148.48 (2C, C$_{60}$), 149.23 (2C, C$_{60}$), 153.59 (2C, C$_{60}$), 154.58 (2C, C$_{60}$), 155.55 (2C, C$_{60}$), 157.68 (2C, C$_{60}$).

APCI-MS(−) (toluene/isopropyl alcohol=7/3): m/z=886 (M−).

The results from X-ray structural analysis of the thus obtained compound are shown in FIG. 1 and Table 1.

TABLE 1

| Molecular formula | C$_{72}$H$_{22}$ | Z | 4 |
|---|---|---|---|
| Crystal system | monoclinic | Temp. K | 193(2) |
| Space group | Pc (No. 7) | Crystal size (mm) | 0.14, 0.05, 0.03 |
| Reliability factor R1, wR2 (all data) | 0.0744, 0.2003 | Density (g/cm$^{-3}$) | 1.537 |
| Reliability factor R, Rw | 0.0609, 0.1644 | Measuring range, deg | 4.68 < 2θ < 51.46 |
| Goodness of fit (GOF) on P | 1.088 | Number of reflection (total) | 6629 |
| a, Å | 11.7560(7) | Number of reflection (individual) | 5241 |
| b, Å | 18.4530(5) | Number of parameters | 1298 |
| c, Å | 17.9510(10) | Δ, eÅ$^{-3}$ | 0.417, −0.317 |
| β, deg | 100.229(2) | | |

Example 5

Production of 1-[(4-methoxyphenyl)methyl]-6, 9,12, 15,18-pentamethyl-1,6,9,12,15,18-hexahydro-(C$_{60}$-I$_h$)[5,6]fullerene: [(C$_{60}$Me$_5$(CH$_2$C$_6$H$_4$—OMe-p))

A suspension prepared by dispersing 20.0 mg (0.022 mmol) of C$_{60}$Me$_5$Br in 2.0 mL of 4-methoxytoluene was added to a solution prepared by dissolving 12.2 mg (0.0137 mmol) of [IrCl(cyclooctene)$_2$]$_2$ in 2.0 mL of 4-methoxytoluene. The resultant mixture was stirred at room temperature for one hour, thereby obtaining dark-reddish brown suspension. The obtained suspension was passed through a silica gel column and subjected to preparative high performance liquid chromatography using "Buckyprep." (manufactured by Nacalai Tesque Inc.; 20 mm×250 mm; eluent: toluene/isopropyl alcohol =7/3; flow rate: 16 mL/min; retention time: 7 min). This procedure was repeated appropriate times, thereby obtaining 1.69 mg of reddish brown crystals of 1-[(4-methoxyphenyl) methyl]-6,9,12,15,18-pentamethyl-1,6,9,12,15,18-hexahydro-($C_{60}$—$I_h$) [5,6]fullerene (yield: 16%). The obtained product was subjected to instrumental analyses, and data obtained by these analyses are shown below.

$^1$H-NMR (270 MHz; solvent: $CDCl_3$):δ 1.86 (s, 6H, CC$\underline{H}_3$), 2.46 (s, 6H, CC$\underline{H}_3$), 2.50 (s, 3H, CC$\underline{H}_3$), 3.78 (s, 2H, C$\underline{H}_2$), 3.92 (s, 3H, OC$\underline{H}_3$), 6.99 (m, 2H, o-$C_6H_5$), 7.45 (m, 2H, m-$C_6H_5$).

APCI-MS(−) (eluent: toluene/isopropyl alcohol=7/3): m/z =916 (M−).

Example 6

Production of 1-(1-propenyl)-6,9,12,15,18-pentamethyl-1, 6,9,12,15,18-hexahydro-($C_{60}$—$I_h$)[5,6]fullerene: ($C_6Me_5(CH_2CH=CH_2)$)

A tetrahydrofuran solution (1.0 mol/L; 0.129 mL) containing 0.129 μmol of potassium t-butoxide was added to a suspension prepared by dispersing 93.3 mg (0.117 mmol) of $C_{60}Me_5H$ in 9.0 mL of tetrahydrofuran, thereby obtaining a dark-reddish orange solution. To the thus obtained solution was added 14.3 μL (0.176 μmol) of allyl chloride. The resultant reaction solution was stirred at 25° C. for 10 min, and then allowed to stand under reduced pressure to remove the solvent therefrom. The reaction solution was subjected to preparative high performance liquid chromatography using "Buckyprep." (manufactured by Nacalai Tesque Inc.; column size: 20 mm×250 mmφ; eluent: toluene/isopropyl alcohol=7/3; flow rate: 20 mL/min; retention time: 5.5 to 6.5 min), thereby obtaining 42.5 mg of reddish orange fine crystals of 1-(1-propenyl)-6, 9,12,15,18-pentamethyl-1,6,9,12,15,18-hexahydro-($C_{60}$—$I_h$) [5,6]fullerene (yield: 43%). The obtained product was subjected to instrumental analyses, and data obtained by these analyses are shown below.

$^1$H-NMR (400 MHz; solvent: $CDCl_3$):δ 2.24 (s, 6H, Me), 2.27 (s, 6H, Me), 2.40 (s, 3H, Me), 3.27 (d, $^3J$=7.2 Hz, 2H, C$\underline{H}_2CH=CH_2$), 5.27 (dd, $^3J$=16.0 Hz, $^3J$=2.0 Hz, 1H, $CH_2CH=C\underline{H}_2$), 5.41 (dd, $^3J$=10.0 Hz, $^3J$=2.0 Hz, 1H, $CH_2CH=C\underline{H}_2$), 6.19 (ddt, $^3J$=16.0 Hz, $^3J$=10.0 Hz, $^3J$=7.2 Hz, 1H, $CH_2C\underline{H}=CH_2$).

$^1$H-NMR (400 MHz; solvent: $CDCl_3/CS_2$=⅓):δ 2.28 (s, 6H, Me), 2.30 (s, 6H, Me), 2.43 (s, 3H, Me), 3.29 (d, $^3J$=7.2 Hz, 2H, C$\underline{H}_2CH=CH_2$), 5.30 (dd, $^3J$=16.0 Hz, $^3J$=2.0 Hz, 1H, $CH_2CH=C\underline{H}_2$), 5.41 (dd, $^3J$=10.0 Hz, $^3J$=2.0 Hz, 1H, $CH_2CH=C\underline{H}_2$), 6.21 (ddt, $^3J$=16.0 Hz, $^3J$=10.0 Hz, $^3J$=7.2 Hz, 1H, $CH_2C\underline{H}=CH_2$).

$^{13}$C-NMR (100 MHz; solvent: $CDCl_3/CS_2$=⅓):δ 24.31 (2C, Me), 27.16 (2C, Me), 28.92 (1C, Me), 40.02 (1C, $\underline{C}H_2CH=CH_2$), 50.31 (2C, $C_{60}(sp^3)$), 52.40 (2C, $C_{60}(sp^3)$), 53.40 (1C, $C_{60}(sp^3)$), 61.80 (1C, $sp^3$), 118.66 (1C, olefin), 131.48 (1C, olefin), 142.49 (2C), 142.98 (2C), 143.59 (2C), 143.61 (2C), 144.00 (2C), 144.04 (2C), 144.08 (2C), 144.39 (2C), 144.42 (2C), 145.05 (2C), 145.54 (2C), 146.25 (2C), 146.44 (2C), 146.46 (2C), 147.37 (2C), 147.49 (2C), 147.56 (1C), 147.65 (2C), 147.86 (2C), 147.97 (2C), 147.99 (1C), 148.06 (2C), 148.20 (2C), 148.91 (2C), 153.23 (2C), 154.34 (2C), 155.21 (2C), 157.30 (2C).

IR (powder on diamond probe; units: $cm^{-1}$): ν2957 (m), 2915 (m), 2855 (w), 1636 (w), 1603 (w), 1573 (w), 1545 (w), 1521 (w), 1494 (m), 1458 (m), 1439 (s), 1416 (m), 1370 (m), 1286 (m), 1266 (m), 1238 (m), 1200 (m), 1174 (w), 1160 (w), 1153 (w), 1142 (w), 1129 (m), 1105 (m), 1041 (m), 984 (m), 952 (w), 912 (s), 803 (m), 790 (m), 778 (w), 771 (m), 725 (s), 713 (m), 695 (m), 688 (s), 667 (m).

Ultraviolet-visible absorption spectrometry (hereinafter referred to merely as "UV-vis") ($1.0 \times 10^{-5}$ mol/L in $CH_2Cl_2$) $\lambda_{max}$ (ε) 255 (66800, shoulder), 348 (21900), 356 (20600, shoulder), 396 (12500), 476 (3450, shoulder).

APCI-MS(+): m/z=837 ([M+H]$^+$).

Example 7

Production of 1-(1-propenyl)-6,9,12,15,18-pentaphenyl-1, 6,9,12,15,18-hexahydro-($C_{60}$—$I_h$)[5,6]fullerene: [($C_{60}Ph_5(CH_2CH=CH_2$))

A tetrahydrofuran solution (1.0 mol/L; 0.10 mL) containing 0.10 mmol of potassium t-butoxide was added to a suspension prepared by dispersing 100 mg (0.090 mmol) of $C_{60}Ph_5H$ in 10.0 mL of tetrahydrofuran, thereby obtaining a dark-reddish orange solution. To the thus obtained solution was added 18.2 mg (0.0497 nmol) of $[PdCl(\eta^3$-allyl)$]_2$. The resultant reaction solution was stirred at 25° C. for 10 min, followed by adding 1.0 mL of a saturated ammonium chloride aqueous solution to stop the reaction. The resultant mixed solution was diluted with toluene and then washed with water. An organic phase was separated from the obtained solution, and then dried with magnesium sulfate and concentrated under reduced pressure. The obtained reaction solution was subjected to preparative high performance liquid chromatography using "Buckyprep." (manufactured by Nacalai Tesque Inc.; column size: 20 mm×250 mmφ; eluent: toluene/isopropyl alcohol=7/3; flow rate: 18 mL/min; retention time: 6.0 to 6.5 min), thereby obtaining 9.5 mg of reddish orange fine crystals of 1-(1-propenyl)-6,9,12,15,18-pentaphenyl-1, 6,9, 12,15,18-hexahydro-($C_{60}$—$I_h$)[5,6]fullerene (yield: 9.2%). The obtained product was subjected to instrumental analyses, and data obtained by these analyses are shown below.

$^1$H-NMR (400 MHz; solvent: $CDCl_3$):δ 2.24 (d, $^3J$=6.8 Hz, 2H, C$\underline{H}_2CH=CH_2$), 4.64 (dd, $^3J$=19.2 Hz, $^3J$=2.0 Hz, 1H, $CH_2CH=C\underline{H}_2$), 5.10 (dd, $^3J$=12.4 Hz, $^3J$=2.0 Hz, 1H, $CH_2CH=C\underline{H}_2$), 5.96 (ddt, $^3J$=19.2 Hz, $^3J$=12.4 Hz, $^3J$=6.8 Hz, 1H, $CH_2C\underline{H}=CH_2$), 7.16-7.19 (m, 4H, Ph), 7.30-7.43 (m, 13H, Ph), 7.75-7.78 (m, 4H, Ph), 7.87-7.90 (m, 4H, Ph).

$^1$H-NMR (400 MHz; solvent: $CDCl_3/CS_2$=⅓):δ 2.18 (d, $^3J$=6.8 Hz, 2H, C$\underline{H}_2CH=CH_2$), 4.58 (d, $^3J$=17.2 Hz, 2H, $CH_2CH=C\underline{H}_2$), 5.02 (d, $^3J$=10.0 Hz, 2H, $CH_2CH=C\underline{H}_2$), 5.89 (ddt, $^3J$=17.2 Hz, $^3J$=10.0 Hz, $^3J$=6.8 Hz, 1H, $CH_2C\underline{H}=CH_2$), 7.09-7.11 (m, 4H, Ph), 7.22-7.32 (m, 13H, Ph), 7.67-7.69 (m, 4H, Ph), 7.77-7.79 (m, 4H, Ph).

$^{13}$C-NMR (100 MHz; solvent: $CDCl_3/CS_2$=⅓):δ 43.81 (1C, $\underline{C}H_2CH=CH_2$), 58.26 (2C, $sp^3$), 60.80 (1C, $sp^3$), 62.86 (1C, $sp^3$), 64.81 (2C, $sp^3$), 118.91 (1C, olefin), 126.77 (1C, olefin), 127.34 (2C), 127.47 (2C), 127.73 (2C), 127.85 (4C), 128.05 (4C), 128.41 (4C), 128.52 (4C), 130.23 (2C), 133.56 (2C), 137.97 (2C), 139.40 (1C), 142.01 (1C), 142.36 (2C), 143.13 (2C), 143.30 (2C), 143.50 (2C), 143.68 (2C), 143.76 (2C), 143.83 (2C), 143.95 (2C), 144.08 (2C), 144.19 (2C), 144.89 (2C), 145.01 (2C), 146.68 (1C), 146.87 (2C), 146.92 (2C), 147.06 (2C), 147.43 (1C), 147.66 (2C), 147.80 (2C), 147.89 (2C), 148.05 (2C), 148.19 (2C), 148.32 (2C), 148.39 (2C), 150.85 (2C), 152.48 (2C), 155.85 (2C), 156.25 (2C).

IR (powder on diamond probe; units: $cm^{-1}$): ν3056 (w), 3023 (w), 2956 (w), 2920 (m), 2851 (m), 1961 (w), 1943 (w), 1724 (brm), 1597 (m), 1491 (m), 1462 (m), 1445 (m), 1419 (w), 1376 (w), 1288 (w), 1260 (m), 1237 (w), 1203 (w), 1183

(w), 1156 (w), 1069 (m), 1029 (s), 1003 (m), 910 (m), 896 (w), 837 (w), 799 (m), 758 (m), 742 (m), 733 (m), 693 (s), 683 (m), 671 (m).

UV-vis ($1.0 \times 10^{-5}$ mol/L in $CH_2Cl_2$)$\lambda_{max}$ ($\epsilon$) 260 (81800, shoulder), 272 (75100, shoulder), 354 (22300, shoulder), 395 (11800, shoulder), 474 (4310, shoulder).

APCI-MS($\pm$): m/z=1147 ([M+H]$^+$), 1146 (M$^-$).

Example 8

Production of 1-(1-phenyethyl)-6,9,12,15,18-pentamethyl-1, 6,9,12,15,18-hexahydro-($C_{60}$—$I_h$)[5,6]fullerene: [($C_{60}Me_5(CH(CH_3)Ph)$)]

A suspension prepared by dispersing 20.0 mg (0.021 mmol) of $C_{60}Me_5Cl$ in 5.0 mL of ethyl benzene was added to a solution prepared by dissolving 9.6 mg (0.011 mmol) of [IrCl(cyclooctene)$_2$]$_2$ in 5.0 mL of ethyl benzene. The resultant mixture was stirred at room temperature for one day, thereby obtaining dark-reddish orange suspension. The obtained suspension was passed through a silica gel column and subjected to preparative high performance liquid chromatography using "Buckyprep." (manufactured by Nacalai Tesque Inc.; column size: 20 mm×250 mm$\phi$; eluent: toluene/isopropyl alcohol=7/3; flow rate: 16 mL/min; retention time: 7 min). This procedure was repeated appropriate times, thereby obtaining 4.41 mg of reddish brown crystals of 1-(1-phenylethyl)-6,9,12,15,18-pentamethyl-1, 6,9,12,15,18-hexahydro-($C_{60}$—$I_h$)[5,6]fullerene (yield: 20%). The obtained product was subjected to instrumental analyses, and data obtained by these analyses are shown below.

$^1$H-NMR (400 MHz; solvent: CDCl$_3$):δ 1.31 (s, 3H, $C_{60}$CH$_3$), 2.05 (d, $^2J_{H-H}$=6.8 Hz, 3H, CHC$\underline{H}_3$), 2.26 (s, 3H, CH$_3$), 2.41 (s, 3H, CH$_3$), 2.53 (s, 3H, CH$_3$), 2.73 (s, 3H, CH$_3$), 4.13 (q, $^2J_{H-H}$=6.4 Hz, 1H, CH$_3$C$\underline{H}$), 7.44-7.73 (m, 5H, C$_6$H$_5$).

$^{13}$C{$^1$H}-NMR (400 MHz; solvent: CDCl$_3$):δ 25.70 (1C, $C_{60}\underline{C}H_3$), 26.57 (1C, $C_{60}\underline{C}H_3$), 27.57 (1C, $C_{60}\underline{C}H_3$), 28.04 (1C, $C_{60}\underline{C}H_3$), 28.49 (1C, CHC$\underline{H}_3$), 30.49 (1C, $C_{60}CH_3$), 47.98 (1C, CH$\underline{C}$), 49.93 (1C, CH$_3\underline{C}$), 50.78 (1C, CH$_3\underline{C}$), 52.42 (1C, CH$_3\underline{C}$), 53.24 (1C, CH$_3\underline{C}$), 54.79 (1C, CH$_3\underline{C}$), 69.46 (1C, CH$_3\underline{C}$H), 127.23 (1C, p-C$_6$H$_5$), 127.28 (2C, o-C$_6$H$_5$), (2C, m-C$_6$H$_5$), 142.37 (1C, C$_{60}$), 142.79 (1C, C$_{60}$), 143.09 (1C, C$_{60}$), 143.13 (1C, C$_{60}$), 143.29 (1C, C$_{60}$), 143.34 (1C, C$_{60}$), 143.66 (1C, C$_{60}$), 143.70 (1C, C$_{60}$), 143.73 (1C, C$_{60}$), 143.77 (1C, C$_{60}$), 143.89 (1C, C$_{60}$), 143.91 (1C, C$_{60}$), 143.95 (1C, C$_{60}$), 143.97 (1C, i-C$_6$H$_5$), 144.05 (1C, C$_{60}$), 144.13 (1C, C$_{60}$), 144.14 (1C, C$_{60}$), 144.38 (1C, C$_{60}$), 144.67 (1C, C$_{60}$), 144.78 (1C, C$_{60}$), 144.87 (1C, C$_{60}$), 144.90 (1C, C$_{60}$), 145.05 (1C, C$_{60}$), 145.44 (1C, C$_{60}$), 146.59 (1C, C$_{60}$), 146.75 (1C, C$_{60}$), 146.81 (1C, C$_{60}$), 146.87 (1C, C$_{60}$), 147.05 (1C, C$_{60}$), 147.60 (1C, C$_{60}$), 147.64 (1C, C$_{60}$), 147.71 (1C, C$_{60}$), 147.82 (1C, C$_{60}$), 147.87 (1C, C$_{60}$), 147.92 (1C, C$_{60}$), 148.06 (1C, C$_{60}$), 148.22 (1C, C$_{60}$), 148.31 (1C, C$_{60}$), 148.33 (1C, C$_{60}$), 148.51 (1C, C$_{60}$), 149.14 (1C, C$_{60}$), 149.21 (1C, C$_{60}$), 149.47 (1C, C$_{60}$), 151.24 (1C, C$_{60}$), 152.90 (1C, C$_{60}$), 154.62 (1C, C$_{60}$), 155.60 (1C, C$_{60}$), 157.06 (1C, C$_{60}$), 157.16 (1C, C$_{60}$), 157.74 (1C, C$_{60}$), 159.23 (1C, C$_{60}$) (signals based on m-C$_6$H$_5$ were not separated from other peaks and noises because of too low strength thereof and, therefore, were undetected)

APCI-MS(−) (eluent: toluene/isopropyl alcohol=7/3): m/z=900 (M$^-$).

Example 9

Production of 1-(3-(ethoxycarbonyl)propyl)-6, 9,12,15,18-pentamethyl-1,6,9,12,15,18-hexahydro-($C_{60}$—$I_h$)) [5,6]fullerene: [($C_{60}Me_5(CH_2)_3CO_2Et$)]

A tetrahydrofuran solution (1.0 mol/L; 0.025 mL) containing 0.025 mmol of potassium t-butoxide was added at 25° C. to a suspension prepared by dispersing 10.0 mg (0.013 mmol) of $C_{60}Me_5H$ in 2.0 mL of tetrahydrofuran, so that a color of the reaction solution was changed from red to black. Then, 7.6 mg (0.031 mmol) of ICH$_2$CH$_2$CH$_2$CO$_2$Et was added to the reaction solution, and the resultant mixture was stirred for one hour, followed by adding 0.05 mL of a saturated ammonium chloride aqueous solution thereto to stop the reaction. After the obtained reaction solution was placed under reduced pressure to remove the solvent therefrom, the residual orange-colored solid was dissolved in toluene. The resultant orange-colored solution was mixed with methanol, thereby precipitating and obtaining 10.9 mg (0.012 mmol) of a red solid of 1-(3-(ethoxycarbonyl)propyl)-6,9,12,15,18-pentamethyl-1, 6,9,12,15,18-hexahydro-($C_{60}$—$I_h$)[5,6]fullerene (yield: 92%). The obtained product was subjected to instrumental analyses, and data obtained by these analyses are shown below.

$^1$H-NMR (400 MHz; solvent: CDCl$_3$):δ 1.38 (t, 3H, OCH$_2$C$\underline{H}_3$), 2.19 (m, 2H, C$_{60}$CH$_2$C$\underline{H}_2$), 2.21 (s, 6H, C$_{60}$Me), 2.32 (t, C$\underline{H}_2$COO), 2.35 (s, 6H, C$_{60}$Me), 2.38 (s, 3H, C$_{60}$Me), 2.59 (m, 2H, C$_{60}$C$\underline{H}_2$), 4.27 (q, 2H, OC$\underline{H}_2$CH$_3$).

$^{13}$C-NMR (100 MHz; solvent: CDCl$_3$):δ 14.45 (3C, OCH$_2$$\underline{C}$H$_3$), 18.75 (2C, C$_{60}$CH$_2$C$\underline{H}_2$), 24.39 (2C, C$_{60}$CH$_3$), 27.24 (2C, C$_{60}$CH$_3$), 29.36 (1C, C$_{60}$CH$_3$), 34.42 (2C, C$_{60}$$\underline{C}$H$_2$), 34.62 (2C, $\underline{C}$H$_2$COO), 50.66 (2C, CH$_3\underline{C}$(C$_{60}$)), 52.92 (2C, CH$_3\underline{C}$(C$_{60}$)), 54.11 (1C, CH$_3\underline{C}$(C$_{60}$)), 60.48 (O$\underline{C}$H$_2$CH$_3$), 60.52 (1C, CH$_2\underline{C}$(C$_{60}$)), 142.73 (2C, C$_{60}$), 143.41 (2C, C$_{60}$), 143.88 (2C, C$_{60}$), 143.92 (2C, C$_{60}$), 144.29 (2C, C$_{60}$), 144.35 (2C, C$_{60}$), 144.47 (2C, C$_{60}$), 144.60 (2C, C$_{60}$), 144.88 (2C, C$_{60}$), 144.90 (2C, C$_{60}$), 145.53 (2C, C$_{60}$), 145.95 (2C, C$_{60}$), 146.70 (1C, C$_{60}$), 146.89 (2C, C$_{60}$), 146.91 (2C, C$_{60}$), 147.80 (2C, C$_{60}$), 147.88 (2C, C$_{60}$), 148.05 (2C, C$_{60}$), 148.10 (2C, C$_{60}$), 148.28 (1C, C$_{60}$), 148.45 (2C, C$_{60}$), 148.63 (2C, C$_{60}$), 149.08 (2C, C$_{60}$), 149.46 (2C, C$_{60}$), 153.69 (2C, C$_{60}$), 155.58 (2C, C$_{60}$), 155.94 (2C, C$_{60}$), 157.91 (2C, C$_{60}$).

Example 10

Production of 1-methyl-6,9,12,15,18-pentaphenyl-1, 6,9,12,15,18-hexahydro-($C_{60}$—$I_h$)[5,6]fullerene: [$C_{60}Ph_5Me$]

A tetrahydrofuran solution (1.0 mol/L; 325 µL) containing 325 µmol of potassium t-butoxide was added at 25° C. to a suspension prepared by dispersing 300 mg (271 µmol) of $C_{60}$(phenyl)$_5$H in 15 mL of tetrahydrofuran, so that a color of the reaction solution was changed from red to black. Then, 192 mg (1.35 mmol) of methyl iodide was added to the reaction solution, and the resultant mixture was stirred for one hour, followed by adding 150 µL of a saturated ammonium chloride aqueous solution thereto to stop the reaction. The obtained reaction solution was mixed with 150 mL of toluene to dissolve the reaction product therein. The obtained solution was subjected to a flash chromatography using a silica gel column and an eluent containing toluene and chloroform at a ratio of 9:1, concentrated and then dried under reduced pressure, thereby obtaining 243 mg (217 µmol) of a red solid of 1-methyl-6,9,12,15,18-pentaphenyl-1,6,9,12,15,18-hexahydro-($C_{60}$—$I_h$) [5,6]fullerene (yield: 80%). The obtained product was subjected to instrumental analyses, and data obtained by these analyses are shown below.

$^1$H-NMR (270 MHz; solvent: $CDCl_3$):δ 1.48 (s, Me, 3H), 7.37-7.07 (m, Ph, 17H), 7.74 (m, Ph, 4H), 7.87 (m, Ph, 4H).

Example 11 and Comparative Example 1

Oxidation Test 90 mL of a toluene solution of $C_{60}Ph_5H$ (0.33 mg/mL) and 90 mL of a toluene solution of $C_{60}Ph_5Me$ obtained in Example 10 (0.33 mg/mL) were respectively prepared and allowed to stand in air at room temperature. The prepared solutions were sampled in an amount of 0.5 mL for each every several days, and subjected to HPLC analysis to examine the change in quality thereof with time. The HPLC analysis conditions were ODS; column size: 150 mm×4.6 mmφ; eluent: toluene/methanol=4/6; flow rate: 1.0 mL/min; detector used: UV 290 nm. The change in ratio of peak area of $C_{60}Ph_5H$ or $C_{60}Ph_5Me$ to whole peak area with time is shown in Table 2, and the graphic representation of these data is shown in FIG. 2.

Figure 2:
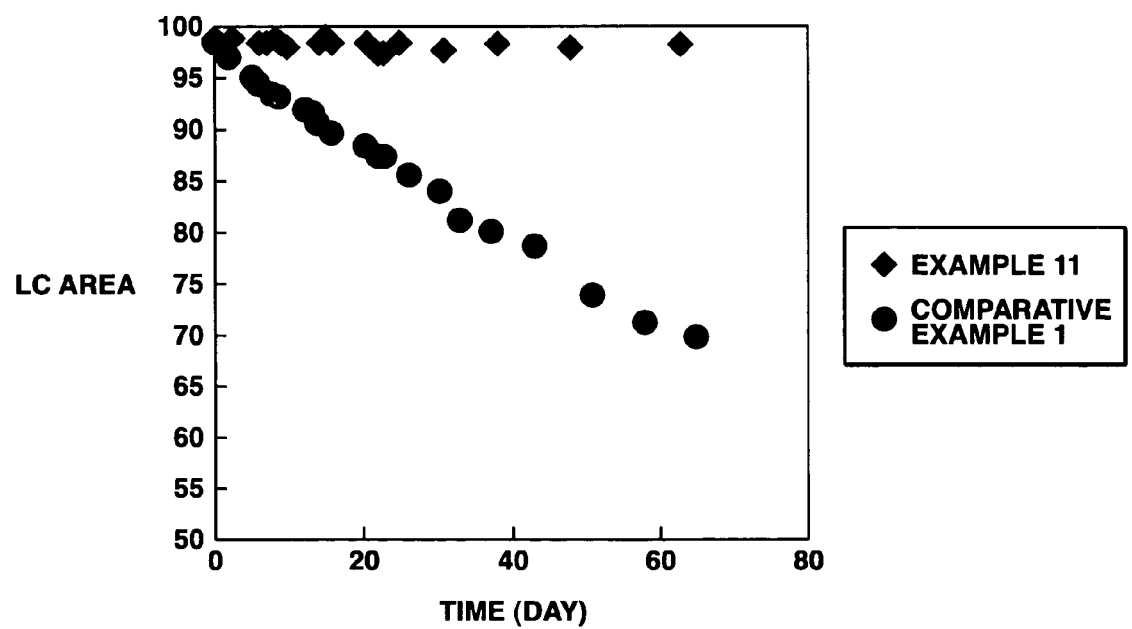
FIG. 2 is a graph showing the change in ratio of peak area of each of $C_{60}Ph_5H$ and $C_{60}Ph_5Me$ to whole peak area as measured by HPLC when allowing toluene solutions of these starting compounds to stand in air.
Figure 3:
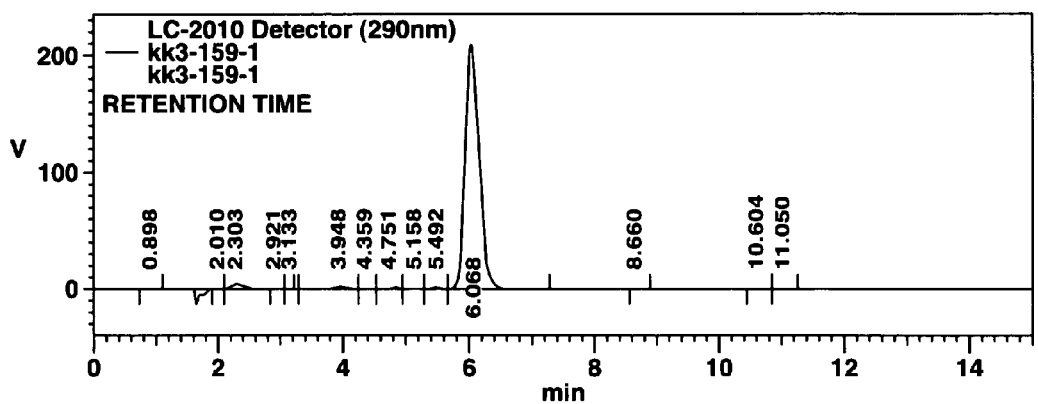
FIG. 3 is an HPLC chart of a $C_{60}Ph_5H$ solution at an initial stage of an oxidation test thereof wherein the ratio of peak area of the starting compound to whole peak area was 98.5%.
Figure 4:
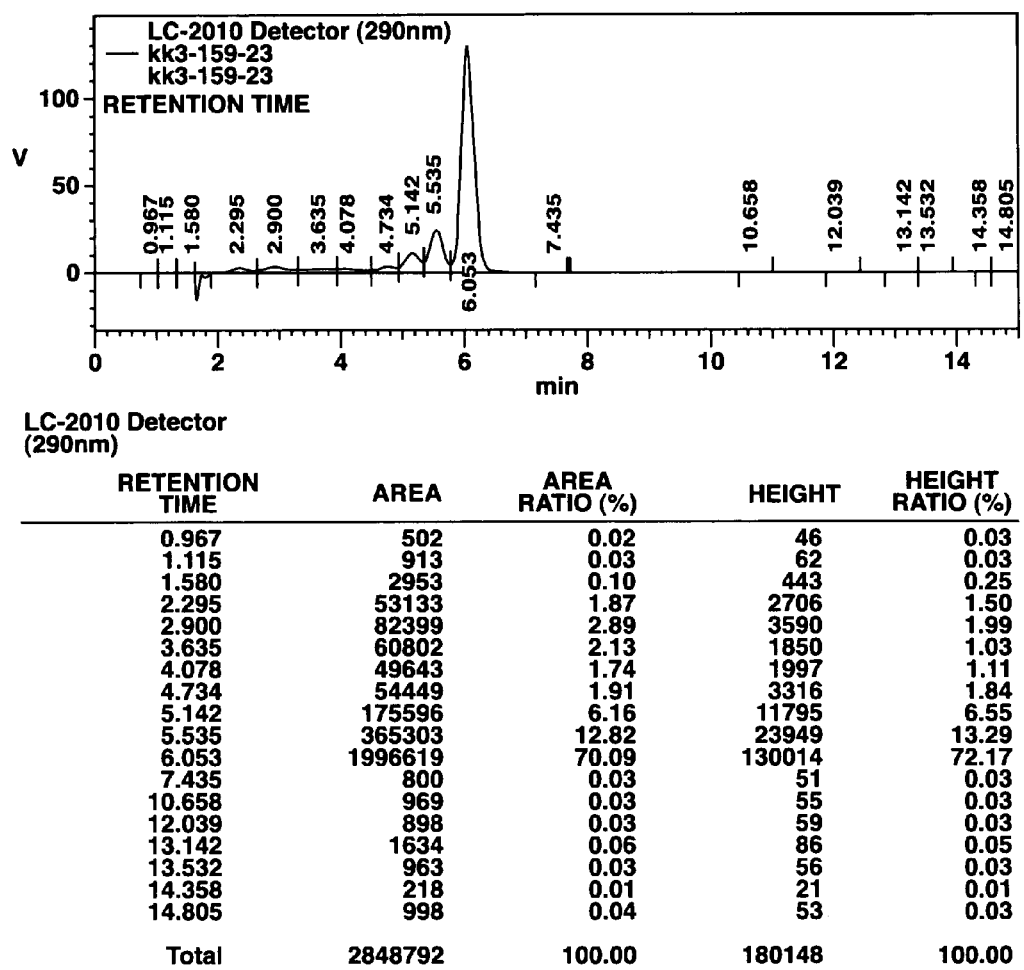
FIG. 4 is an HPLC chart of the $C_{60}Ph_5H$ solution after the elapse of 58 days from initiation of the oxidation test wherein the ratio of peak area of the starting compound to whole peak area was 71.4%.
Figure 5:
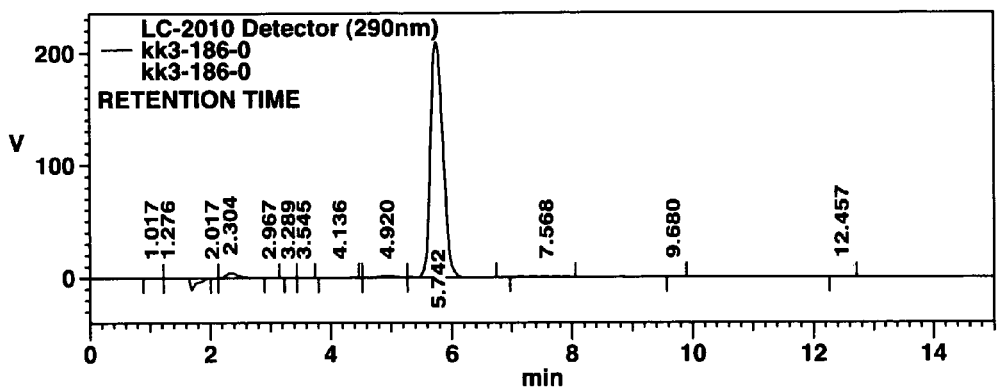
FIG. 5 is an HPLC chart of a $C_{60}Ph_5Me$ solution at an initial stage of an oxidation test thereof wherein the ratio of peak area of the starting compound to whole peak area was 98.8%.
Figure 6:
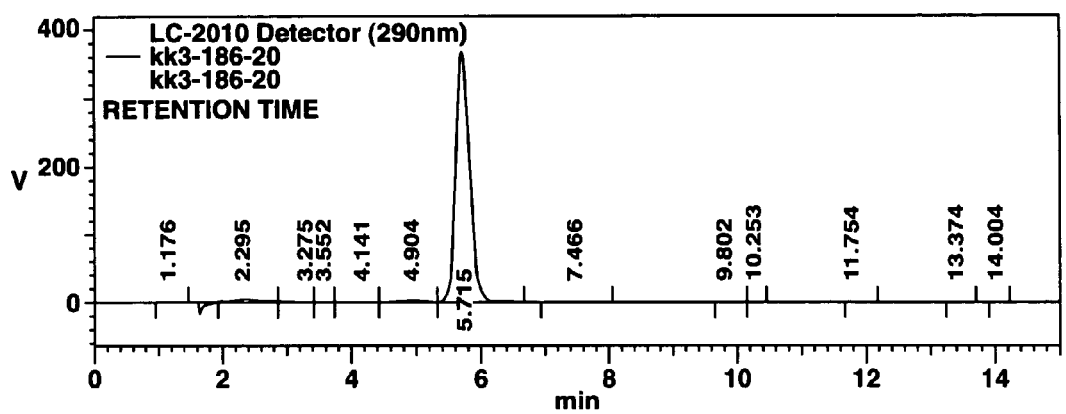
FIG. 6 is an HPLC chart of the $C_{60}Ph_5Me$ solution after the elapse of 63 days from initiation of the oxidation test wherein the ratio of peak area of the starting compound to whole peak area was 98.3%.

As recognized from Table 2 and FIG. 2, the area ratio of the peak attributed to $C_{60}Ph_5H$ was reduced at a rate of about 0.45% per day, and reached 70.1% after 63 days, whereas the area ratio of the peak attributed to $C_{60}Ph_5Me$ was kept substantially unchanged, namely, the peak area ratio even after 63 days was 98.3% that was substantially identical to 98.8% observed immediately after initiation of the test. The HPLC charts of the $C_{60}Ph_5H$ solution upon initiation of the test and after the elapse of 58 days are shown in FIGS. 3 and 4, respectively, whereas the HPLC charts of the $C_{60}Ph_5Me$ solution upon initiation of the test and after the elapse of 63 days are shown in FIGS. 5 and 6, respectively. From these figures, it was also confirmed that $C_{60}Ph_5H$ suffered from a considerable reduction in peak area ratio due to the conversion into high-polar substances, whereas $C_{60}Ph_5Me$ was kept substantially unchanged in peak area ratio even after preserved in the form of a solution for a long period of time.

TABLE 2

| $C_{60}Ph_5H$ | | $C_{60}Ph_5Me$ | |
|---|---|---|---|
| Time (day) | Peak area ratio (%) | Time (day) | Peak area ratio (%) |
| 0 | 98.5 | 0 | 98.8 |
| 1 | 97.5 | 1 | 98.4 |
| 2 | 96.7 | 2 | 98.9 |
| 5 | 95.0 | 3 | 98.8 |
| 6 | 94.4 | 6 | 98.4 |
| 8 | 93.2 | 7 | 98.3 |
| 9 | 92.9 | 8 | 98.7 |
| 12 | 92.0 | 9 | 98.5 |
| 13 | 91.7 | 10 | 98.0 |
| 14 | 90.6 | 14 | 98.3 |
| 15 | 90.1 | 15 | 98.9 |
| 16 | 89.6 | 16 | 98.4 |
| 20 | 88.6 | 20 | 98.4 |
| 22 | 87.4 | 21 | 98.4 |
| 23 | 87.4 | 22 | 97.1 |
| 26 | 85.9 | 23 | 97.4 |
| 30 | 84.3 | 25 | 98.5 |
| 33 | 81.5 | 31 | 97.9 |
| 37 | 80.4 | 38 | 98.2 |
| 43 | 78.9 | 48 | 98.1 |
| 51 | 74.1 | 63 | 98.3 |
| 58 | 71.4 | | |
| 65 | 70.1 | | |

Examples 12 and 13 and Comparative Examples 2 and 3

Solubility $C_{60}Me_5$—$(CH_2)_3OH$ obtained in Example 2 and $C_{60}Me_5$—$(CH_2)_3CO_2Et$ obtained in Example 9 as well as $C_{60}$ and $C_{60}Me_5H$ were tested to measure solubility values (in mg/mL) to tetrahydrofuran (THF), chloroform ($CHCl_3$), N,N-dimethylformamide (DMF) and ethyl acetate (EtOAc) at 25° C. The results are shown in Table 3. As is apparent from Table 3, the introduction of —$(CH_2)_3OH$ group and —$(CH_2)_3CO_2Et$ group considerably improved the solubility of these fullerene derivatives.

TABLE 3

| | Comparative Example 2 | Comparative Example 3 | Example 12 | Example 13 |
|---|---|---|---|---|
| Solvent | $C_{60}$ | $C_{60}Me_5H$ | $C_{60}Me_5$—$(CH_2)_3OH$ | $C_{60}Me_5$—$(CH_2)_3CO_2Et$ |
| THF | 0.0* | 9.1 | 59.7 | 103.0 |
| $CHCl_3$ | 0.2* | 5.2 | 21.0 | 35.9 |
| DMF | 0.0 | 0.5 | 44.4 | 15.4 |
| EtOAc | 0.0 | 0.0 | 6.0 | 3.9 |

Note:
In Table 3, the data marked with * were values described in "J. Phys. Chem.", 97, 3379(1993).

What is claimed is:

1. A fullerene derivative having a partial structure represented by the general formula (I):

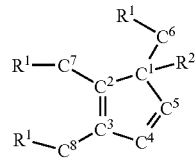

(I)

wherein $C^1$ to $C^8$ are carbon atoms constituting a fullerene skeleton in which $C^6$ to $C^8$ are independently bonded to a group $R^1$ having 1 to 50 carbon atoms, and $C^1$ is bonded to a group $R^2$ which is a substituted or unsubstituted alkyl group having 1 to 20 carbon atoms wherein $R^1$ and $R^2$ are different from each other.

2. A fullerene derivative according to claim 1, wherein said fullerene derivative is unsusceptible to oxidation.

3. A fullerene derivative according to claim 1, wherein said fullerene skeleton is a fullerene $C_{60}$.

4. A fullerene derivative according to claim 1, wherein carbon atoms on a cyclopentadiene ring of the fullerene skeleton are respectively bonded to an alkyl group containing 4 or more carbon atoms.

5. A fullerene derivative according to claim 1, wherein carbon atoms on a cyclopentadiene ring of the fullerene skeleton are respectively bonded to a organic group having a polar functional group.

6. A fullerene derivative according to claim 1, wherein carbon atoms on a cyclopentadiene ring of the fullerene skeleton are not bonded to a substituent group having a non-aromatic unsaturated bond.

7. A fullerene derivative according to claim 1, wherein carbon atoms adjacent to carbon atoms on a cyclopentadiene ring of the fullerene skeleton are respectively bonded to an alkyl or aryl group.

8. A fullerene derivative according to claim 1, wherein carbon atoms adjacent to carbon atoms on a cyclopentadiene ring of the fullerene skeleton are respectively bonded to an methyl or phenyl group.

9. The fullerene derivative according to claim 1, wherein $R^1$ is selected from an aryl group, an aralkyl group, and a heterocyclic group.

10. The fullerene derivative according to claim 1, wherein $R^1$ is an aryl group.

11. A fullerene derivative having a partial structure represented by the general formula (II):

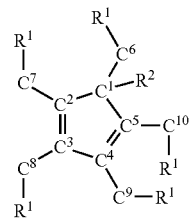

(II)

wherein $C^1$ to $C^{10}$ all are carbon atoms constituting a fullerene skeleton in which $C^6$ to $C^{10}$ are independently bonded to a group $R^1$ having 1 to 50 carbon atoms, and $C^1$ is bonded to a group $R^2$ which is a substituted or unsubstituted alkyl group having 1 to 20 carbon atoms wherein $R^1$ and $R^2$ are different from each other.

12. A process for producing the fullerene derivative as defined in claim 1, comprising: alkylating a fullerene derivative having hydrogen atoms on a cyclopentadiene ring of a fullerene skeleton thereof.

13. A process according to claim 12, wherein said alkylation is carried out using an alkylating agent represented by the general formula:

$R^2$-X wherein $R^2$ is a substituted or unsubstituted alkyl group having 1 to 20 carbon atoms; and X is a leaving group.

14. A process for producing the fullerene derivative as defined in claim 1, comprising: reacting a fullerene derivative having hydrogen atoms on a cyclopentadiene ring of a fullerene skeleton thereof with a transition metal complex having a type ligand.

15. A process for producing the fullerene derivative as defined in claim comprising: reacting a fullerene derivative having halogen atoms on a cyclopentadiene ring of a fullerene skeleton thereof with an arylalkane compound in the presence of a transition metal complex wherein the valence number of transition metal is 2 or less.

* * * * *